3,149,104
4-HYDROXY-7-STYRYL-1,8-NAPHTHYRIDINE-3-CARBOXYLIC ACIDS AND ESTERS

George Y. Lesher and Monte D. Gruett, Schodack, N.Y., assignors to Sterling Drug Inc., New York, N.Y., a corporation of Delaware
No Drawing. Filed Jan. 3, 1961, Ser. No. 79,951
5 Claims. (Cl. 260—240)

This invention relates to 1,8-naphthyridines and particularly to 1,3-disubstituted-4-oxo compounds thereof, to intermediates useful in the preparation and to a method of preparing said compounds.

The invention, in its 1,3-disubstituted-4-oxo-1,8-naphthyridine aspect, is described as residing in the concept of a compound having a molecular structure in which an organic radical having up to and including eighteen carbon atoms and having a molecular weight not over 700 is attached through a saturated carbon atom thereof to the 1-nitrogen atom of 3-X-4-oxo-1,8-naphthyridines where X stands for carboxy or a group convertible thereto by hydrolysis.

The physical embodiments of our invention have been tested by standard bacteriological and pharmacological evaluation procedures and found to have antibacterial and sedative properties. They are also useful as intermediates in organic syntheses.

Illustrative and preferred embodiments of our 1,3-disubstituted-4-oxo-1,8-naphthyridines are those having the Formula I

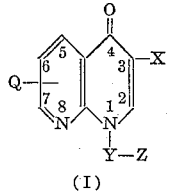

(I)

where X is carboxy and salts thereof, carbalkoxy having from one to eleven carbon atoms inclusive, carbo-[(lower - tertiary - amino) - (polycarbon - lower - alkoxy)], cyano, carbamyl and aminocarbamyl, Y is divalent aliphatic hydrocarbon attached to the ring-nitrogen atom through a saturated carbon atom and having from one to ten carbon atoms inclusive, Z is a member of the group consisting of hydrogen, hydroxy, halo, carboxy, lower-carbalkoxy, cyano, carbamyl, lower-hydrocarbonoxy, lower-secondary-amino, lower-tertiary-amino, lower-cycloalkyl and lower-aromatic, and Q stands for hydrogen or from one to four low-molecular weight substituents at positions 2,5,6 and 7 of the naphthyridine nucleus, said substituents selected from the group consisting of lower-alkyl, lower-alkoxy, lower-alkyl-mercapto, lower-alkyl-sulfinyl, lower-alkylsulfonyl, halo, hydroxy, hydroxy-(lower-alkyl), lower-alkyl-amino, di-(lower-alkyl) amino, nitro, amino, hydrazino, lower-carboxylic-acyl-amino, trihalomethyl, lower-alkanoyl, (lower-tertiary-amino) - (polycarbon - lower - alkyl), (lower - secondary-amino) - (polycarbon-lower-alkyl), (lower-tertiary-amino)-(polycarbon-lower-alkylamino), lower - secondary-amino) - (polycarbon - lower - alkylamino), lower - tertiary - amino) - (polycarbon - lower - alkoxy), (lower-secondary - amino)-(polycarbon-lower - alkoxy), monocarbocyclic - aryl, monocarbocyclic - aryloxy, monocarbocyclic - arylmercapto, monocarbocyclic - arylamino, (monocarbocyclic - aryl) - (lower - alkyl), (monocarbocyclic - aryl) - (lower - alkenyl), monocarbocyclic - aroyl, (monocarbocyclic-aryl)-(lower-alkoxy), cyano, amino-(lower - alkyl), (lower -alkanoyl - amino) - (lower-alkyl), carbamyl, carboxy and lower-carbalkoxy. Unless otherwise indicated hereinabove or hereinbelow, the word "lower" when used with an alkyl moietry means alkyl, either straight- or branch-chained, having from one to six carbon atoms inclusive, e.g., lower-alkoxy stands for methoxy, ethoxy, n-propoxy, i-propoxy, n-butoxy, 2-butoxy, i-butoxy, n-pentoxy, 3-pentoxy and n-hexoxy. Particularly preferred embodiments of our invention because of their relative ease of preparation due to ready availability of intermedites and because of their high anti-bacterial and/or sedative properties are the compounds having Formula I where Q is one or two substituents other than hydrogen and at least one is in the 7-position of the naphthyridine ring.

When Z of Formula I is hydrogen, Z—Y means aliphatic-hydrocarbon radicals having from one to ten carbon atoms inclusive and having a saturated carbon atom linked to the 1-nitrogen atom of the 1,8-naphthyridine ring, and comprehends alkyl, alkenyl and alkynyl radicals, illustrated by methyl, ethyl, n-propyl, isopropyl, 2-butyl, isoamyl, n-hexyl, n-octyl, n-decyl, and the like, when alkyl; 2-propenyl (allyl), 2-methyl-2-propenyl, 3-butenyl, 2-hexenyl, and the like, when alkenyl; and 2-propynyl (propargyl), 3-butynyl, 2-octynyl, and the like when alkynyl. When Z is other than hydrogen, as named above and illustrated below, the term "Z-(aliphatic-hydrocarbon)," i.e., Z—Y— as used in Formula I, means the above illustrated aliphatic-hydrocarbon radicals substituted by radicals as named above for Z and as further illustrated below or, in other words, Y or "aliphatic-hydrocarbon" is a divalent aliphatic hydrocarbon radical having from one to ten carbon atoms and is linked to the ring-nitrogen atom of the naphthyridine nucleus through a saturated carbon atom.

The term "lower-carbalkoxy," as used herein, e.g., for Z in Formula I, means carbalkoxy radicals where the alkoxy portion can be straight- or branched-chained and has from one to six carbon atoms, as illustrated by carbomethoxy, carbethoxy, carbo-n-propoxy, carbisopropoxy, carbo-n-butoxy, carbo-n-hexoxy, and the like. Where Z is lower-carbalkoxy, Z—Y is exemplified by carbomethoxymethyl, 4-carbethoxybutyl and 3-carbo-n-butoxy-2-propenyl.

The term "lower-hydrocarbonoxy," as used herein, means hydrocarbonoxy radicals having from one to eight carbon atoms where hydrocarbon is, for instance, alkyl, alkenyl, alkynyl, cycloalkyl, cycloalkylalkyl, phenyl, alkylated-phenyl, benzyl or phenethyl, as further illustrated by methyl, ethyl, n-propyl, isopropyl, 2-butyl, isoamyl, n-hexyl, and the like, when alkyl; ethenyl(vinyl), 2-propenyl, 3-butenyl, 2-hexenyl, and the like, when alkenyl; 2-propynyl(propargyl), 3-hexynyl, and the like, when alknyl; cyclopropyl, cyclobutyl, cyclopentyl, cyclohexyl, cyclooctyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl. When Z is lower-hydrocarbonoxy, Z—Y is, e.g., 2-ethoxyethyl, 3-(propenoxy)propyl and 4-phenoxy-2-butenyl.

The term "lower-cycloalkyl," as used herein, means cycloalkyl radicals having from three to eight ring-carbon atoms and having up to a total of about eight carbon atoms, as illustrated by cyclopropyl, cyclopentyl, cyclohexyl, 2-methylcyclohexyl, 4-ethylcyclohexyl, cyclooctyl, and the like. When Z is lower-cycloalkyl, Z—Y is, e.g., 4-cyclopropylbutyl and 2-cyclohexylpropyl.

The term "lower-aromatic," as used herein means radicals having one or two aromatic rings which can be benzenoid or five- or six-membered hetero-aromatic, as illustrated by phenyl, naphthyl, biphenylyl, pyridyl, pyrimidyl, furyl, thiazolyl, oxazolyl, triazinyl, thienyl, and the like. Preferred embodiments have as "lower-aromatic" monocarbocyclic-aryl radicals having six ring-carbon atoms, that is, aryl radicals of the benzene series. These embodiments, which are preferred primarily because of their commercial practicability due to availability of intermediates, include compounds where "lower-aromatic" is the unsubstituted phenyl radical and phenyl radicals substituted by low-molecular weight substituents such as lower-alkyl, lower-alkoxy, lower-alkylmercapto, lower-alkylsulfinyl, lower-alkylsulfonyl, halo, lower-alkylamino, di-(lower - alkyl)amino, nitro, amino, lower-carboxylic-acylamino, trihalomethyl, phenoxy, benzyloxy, benzoyl, lower-alkanoyl, (lower-tertiary-amino)-(polycarbon-lower-alkyl), (lower-secondary-amino) - (polycarbon-lower-alkyl), (lower-tertiary-amino) - (polycarbon-lower-alkylamino), lower-secondary-amino) - (polycarbon-lower-alkylamino), (lower-tertiary-amino) - (polycarbon-lower-alkoxy), (lower-secondary-amino) - (polycarbon-lower-alkoxy), hydroxy, cyano, aminomethyl, carbamyl, carboxy, lower-carbalkoxy, phenylmercapto, benzyl, 4-methoxyphenyl, and the like. The substituted phenyl radicals have preferably from one to three substituents which can be in any of the available positions of the phenyl nucleus, and where more than one substituent is present, they can be the same or different and they can be in any of the various position combinations relative to each other. The lower-alkyl, lower-alkoxy, lower-alkylmercapto, lower-alkylsulfinyl, lower-alkylsulfonyl, lower-alkylamino, lower-carboxylic-acylamino, lower-alkanoyl and the like substituents have preferably from one to six carbon atoms which can be arranged as straight or branched chains, and are illustrated by methyl, ethyl, n-hexyl, methoxy, isobutoxy, ethylmercapto, n-amylmercapto, methylsulfinyl, n-propylsulfinyl, isopropylsulfonyl, n-butylsulfonyl, ethylamino, n-butylamino, acetylamino, propionylamino, acetyl, propionyl, and the like. When Z is lower-aromatic, Z–Y is, e.g., 4-chlorobenzyl, 2-(2-pyridyl)ethyl, 6-(3,4-dimethoxyphenyl)hexyl and 2-(3,4-dibromophenyl)ethyl.

The term "lower-secondary-amino," as used herein, means secondary-amino radicals having preferably from one to about eight carbon atoms, as illustrated by: monocycloalkylamino radicals where the cycloalkyl group has preferably from three to eight ring-carbon atoms such radicals including cyclopropylamino, cyclobutylamino, cyclopentylamino, cyclohexylamino and cyclooctylamino; mono-(lower-hydroxyalkyl)amino radicals where the lower-hydroxyalkyl group has preferably two to six carbon atoms such radicals including 2-hydroxyethylamino, 3-hydroxypropylamino, 4 - hydroxybutylamino, 2 -hydroxypropylamino, 6 - hydroxyhexylamino, etc.; mono-(lower-alkyl)amino radicals where the lower-alkyl group has preferably from one to six carbon atoms such radicals including methylamino, ethylamino, n-propylamino, isopropylamino, n-butylamino, 2-butylamino, isobutylamino, n-amylamino, n-hexylamino, etc.; mono-[(monocarbocyclic-aryl)methyl]amino radicals, such radicals including benzylamino, 2 - chlorobenzylamino, 3,4 - dichlorobenzylamino, 3 - nitrobenzylamino, 3,4 - diethoxybenzylamino, 4 - isopropylbenzylamino, 2,4,6 - trichlorobenzylamino, etc.; and the like.

The term "lower-tertiary-amino," as used herein means tertiary-amino radicals having two nitrogen substituents such as those illustrated above for the lower-secondary-amino radicals, with preferred tertiary-amino radicals being di-(lower-alkyl)amino radicals where the lower-alkyl radicals are alike or different and each alkyl radical has preferably from one to six carbon atoms, such di-alkylamino radicals including dimethylamino, diethylamino, ethyl-methylamino, diisopropylamino, ethyl-n-propylamino, di-n-butylamino, di-n-hexylamino, and the like. This term "lower-tertiary-amino" also comprehends saturated N-heteromonoycylic radicals having five to six ring atoms, illustrated by 1-piperidyl; (lower-alkylated)-1- piperidyl such as 2-methyl - 1 - piperidyl, 3-ethyl - 1-piperidyl, 4-methyl - 1-piperidyl, 2,6-dimethyl-1-piperidyl; 1-pyrrolidyl; (lower-alkylated)-1-pyrrolidyl such as 2-methyl - 1 - pyrrolidyl, 3-ethyl - 1 - pyrrolidyl, 2,5-dimethyl - 1 - pyrrolidyl; 4-morpholinyl; 1-piperazyl; alkylated - 1 - piperazyl such as 4-methyl-1-piperazyl, 4-ethyl-1-piperazyl, 2,4,6-trimethyl-1-piperazyl; and the like.

When Z stands for lower-secondary-amino or lower-tertiary-amino, Y is preferably polycarbon-lower-alkyl and Z–Y is illustrated by 2-(2-hydroxyethylamino)ethyl, 4-dimethylaminobutyl and 3-(1-piperidyl)propyl.

The term "polycarbon-lower-alkyl," as used herein, means lower-alkylene radicals preferably having from two to six carbon atoms and having its connecting linkages on different carbon atoms, e.g.,

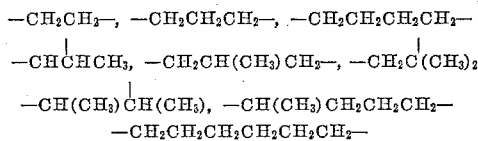

and the like.

The term "halo," as used herein as substituents for the naphthyridine ring, i.e., as Q, or as substituents for the lower-aromatic ring, means chloro, bromo, iodo, or fluoro.

The term "lower-carboxylic-acylamino," as used herein, e.g., as Q, means lower-alkanoylamino and monocarbocyclic-aroylamino, illustrated by formylamino, acetylamino (also acetamido), propionylamino, (also propionamido), butyrylamino, benzoylamino (also benzamido), 2-hydroxybenzoylamino and 4 - aminobenzoylamino, 3-chlorobenzoylamino.

The term "carbo-[(lower-tertiary-amino) - (polycarbon-lower-alkoxy)]," as used herein for X in Formula I, is illustrated by carbo-(2-di-n-butylaminoethoxy), carbo-(dimethylamino - 2 - pentoxy), carbo-[3 - (1 - piperidyl-)propyl], and the like.

The invention in its process aspect, is described as residing in the concept of reacting a 3-X-4-hydroxy-1,8-naphthyridine with an organic ester of a strong acid, i.e., an acid which is practically completely dissociated in aqueous solution. The organic moiety of the ester has up to and including eighteen carbon atoms, has a molecular weight not over 700 and is attached to the anionic portion of the ester through a saturated carbon atom thereof. Illustrative and preferred organic esters are esters of a strong inorganic acid or an organic sulfonic acid, said ester having the formula Z-(aliphatic-hydrocarbon)-An, or Z–Y–An, where An is an anion of a strong inorganic acid or an organic sulfonic acid, e.g., chloride, bromide, iodide, sulfate, benzenesulfonate, para-toluenesulfonate, and the like, and Z and Y have the meanings given above for Formula I. The chloride, bromide or iodide is preferred because of the more ready availability of the requisite Z-(aliphatic-hydrocarbon) halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, or a mixture of such solvents, e.g., a mixture of water and a lower-alkanol. The reaction is generally carried out at a temperature between about room temperature (about 25% C.) and 150° C., preferably at reflux, in a lower-alkanol solvent or a mixture of water and a lower-alkanol.

To illustrate the preparation of the preferred 1,3-di-substituted-4-oxo-1,8-naphthyridines of our invention having Formula I, our process comprises reacting the corresponding 3-X-4-hydroxy-1,8-naphthyridine having the Formula II

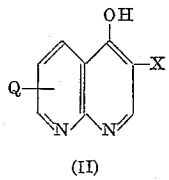

(II)

where Q and X have the meanings given above for Formula I, with an ester having the formula Z-Y-An, where Z and Y have the meanings given above for Formula I and An is an anion of a strong inorganic acid or an organic sulfonic acid, in the presence of a acid-acceptor.

When X is carboxy, i.e., when the intermediate is a 4-hydroxy-1,8-naphthyridine-3-carboxylic acid, the reaction is conveniently carried out by refluxing the acid with a Z-(aliphatic-hydrocarbon) ester, preferably halide, in aqueous ethanol in the presence of potassium or sodium hydroxide to yield the corresponding 1-(Z-Y)-4-oxo-1,8-naphthyridine-3-carboxylic acid; the same 3-carboxylic acid is also obtained using these reaction conditions and a lower-alkyl 4-hydroxy-1,8-naphthyridine-3-carboxylate as the intermediate, the ester hydrolyzing under the reaction conditions to form the acid. If the final product is desired in ester form, e.g., the ethyl ester, the intermediate ethyl 4-hydroxy-1,8-naphthyridine-3-carboxylate is reacted as above using refluxing ethanol as the solvent and sodium ethoxide as the acid-acceptor. The alkylation of the 4-hydroxy-1,8-naphthyridine-3-carboxylic acid can be carried out in the absence of an acid-acceptor by using its di-salt, e.g., by heating a mixture of the anhydrous dipotassium or disodium salt with diethyl sulfate followed by acidification to obtain the 1-ethyl-4-oxo-1,8-naphthyridine-3-carboxylic acid.

Some of the intermediate 4-hydroxy-1,8-naphthyridine-3-carboxylic acids and derivatives are known, e.g., 4-hydroxy-7-methyl-1,8-naphthyridine-3-carboxylic acid and ethyl ester, 7-ethoxy-4-hydroxy-1,8-naphthyridine-3-carboxylic acid and ethyl ester, and 4-hydroxy-1,8-naphthyridine-3-carboxylic acid. Other such intermediates, where novel, are prepared by known methods which are illustrated in the examples or by novel methods which are described further hereinbelow and illustrated in the examples.

Also within the scope of the invention are salts of our above-described 1-substituted-4-oxo-naphthyridine-3-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using methods illustrated hereinbelow in the example.

Preferred ester embodiments of our 1-substituted-4-oxo-1,8-napthyridine-3-carboxylic acids are those derived from alkanols and phenols having up to ten carbon atoms, (lower - tertiary - amino) - (polycarbon-lower-alkanols), (lower - secondary-amino)-(polycarbon-lower-alkanols). Other ester embodiments are the corresponding thiol esters prepared from the corresponding alkylmercaptans, substituted-alkylmercaptans and thiophenols. These esters and their preparation are further illustrated in the examples hereinbelow. Although medicinally acceptable esters are preferred, other and all esters are encompassed by the scope of the invention. All esters are useful in characterizing the free acids and/or as intermediates in purification of the free acids.

Similarly, like the salts and esters, all amide and hydrazide derivatives are within the scope of the invention, and they have the same utilities as the salts and esters. Preferred amide and hydrazide embodiments, which are prepared as illustrated in the examples, are those derived from ammonia or hydrazine, unsubstituted or substituted by one or more low-molecular substituents, e.g., lower-alkyl and monocarbocyclic-aryl.

In its broader aspect, our invention encompasses not only the aforementioned 1-substituted-3-X-4-oxo-1,8-naphthyridines where X stands for carboxy and salt, ester, amide and hydrazide derivatives thereof but also for corresponding compounds where X stands for other groups convertible to carboxy by hydrolysis, e.g., where X stands for C(=NH)O-(lower-alkyl), C(=NH)NH₂

C(=NH)NH(lower-alkyl)

C(=S)OH, C(=S)SH and C(=O)-halide.

Other compounds encompassed by our invention are bis-compounds prepared by our process using bis-esters having the formula An-Y-An where Y has the meaning given above for Formula I and where, in each instance, An is attached to a saturated carbon atom, e.g., the reaction of 4 - hydroxy - 7 - methyl-1,8-naphthyridine-3-carboxylic acid with 1,3-diiodopropane, 1,6-dibromohexane or 1,4-diiodo-2-butene to yield, respectively, 1,3-bis(3-carboxy-7-methyl-4-oxo-1,8-naphthyridyl-1)propane, 1,6-bis(3-carboxy-7-methyl-4-oxo-1,8-naphthyridyl-1)hexane or 1,4-bis(3-carboxy-7-methyl-4-oxo-1,8-naphthyridyl-1)-2-butene. Other bis-compounds encompassed by our invention are those where the two naphthyridine rings are connected by an bis-ester grouping through the 3-carboxy substituent, e.g., the bis-ester obtained by first reacting 1-ethyl-7-methyl-4-oxo-1,8-naphthyridine-3-carboxylic acid with oxalyl chloride to form the corresponding 3-carboxylic acid chloride and then reacting two molar equivalents of the acid chloride with a diol, e.g., 1,3-propanediol, 1,4-dihydroxy-2-butene and 1,6-hexanediol.

Our 1-substituted-4-oxo-1,8-naphthyridine-3-carboxylic acids and derivatives have the further utility as intermediates in the preparation of other of our 1-substituted-4-oxo-1,8-naphthyridine-3-carboxylic acids and derivatives, as illustrated below for the preparation of preferred 7-substituted-naphthyridine embodiments.

For example, the 7-amino-4-oxo-1-substituted-1,8-naphthyridine-3-carboxylic acids and derivatives are conveniently converted into the corresponding 7-diazonium salts which in turn are converted into other 7-substituted-4-oxo-1-[Z-(aliphatic-hydrocarbyl)]-3-carboxylic acids and derivatives, e.g., the corresponding 7-halo and 7-hydroxy compounds. The 7-amino-4-oxo-1-substituted-1,8-naphthyridine-3-carboxylic acids are prepared by reacting a lower-alkyl 7 - acylamino-4-hydroxy-1,8-naphthyridine-3-carboxylate, e.g., the ethyl 7-acetylamino compound, with a Z-(aliphatic-hydrocarbonating) agent, e.g., ethyl iodide or benzyl chloride, to obtain the lower-alkyl 7-acylamino-4-oxo-1-substituted-1,8-naphthyridine-3-carboxylate, e.g., the ethyl 7-acetylamino-4-oxo-1-(ethyl or benzyl)-1,8-naphthyridine-3-carboxylate, which is then hydrolyzed with an acidic agent, e.g., HCl, to remove both the ester and N-acyl groups.

The above intermediate lower-alkyl 7-acylamino-4-hydroxy-1,8-naphthyridine-3-carboxylate is obtained in two steps by first reacting a 2,6-diaminopyridine with one molar equivalent of a dialkyl ethoxymethylenemalonate, preferably the diethyl ester, to yield a dialkyl N-(6-amino-2-pyridylamino)methylenemalonate and then cyclizing this compound by heating it in an appropriate solvent, e.g., diethyl phthalate, Dowtherm A (eutectic mixture of diphenyl and diphenyl ether), mineral oil, with an acyl anhydride, preferably acetic anhydride, to obtain the intermediate lower-alkyl 7-acylamino-4-hydroxy-1,8-naphthyridine-3-carboxylate.

7-hydroxy-4-oxo-1-substituted - 1,8 - naphthyridine-3-carboxylic acids and derivatives are also useful as intermediates for preparation of the corresponding 7-halo compounds by their reaction with a halogenating agent effective to convert hydroxy to halo, e.g., phosphorus oxychloride, thionyl chloride, phosphorus tri- or pentachloride to produce the corresponding 7-chloro compound or phosphorus tribromide to produce the 7-bromo compound.

The 7-halo-4-oxo-1-substituted - 1,8 - naphthyridine-3-carboxylic acids and derivatives, in turn, are useful for the preparation of other corresponding 7-substituted compounds, for example, the 7-alkoxy, 7-alkylmercapto, 7-alkylamino, 7-dialkylamino, 7-hydrazino, 7-[(lower-tertiary-amino- or lower-secondary-amino)-(polycarbon-lower-alkyl)amino], 7-[(lower-tertiary-amino or lower secondary-amino)-(polycarbon-lower-alkoxy)] compounds by reacting the corresponding 7-halo compound respectively, for example, with sodium alkoxide, sodium alkylmercaptide, alkylamine, dialkylamine, hydrazine, tertiary-amino- or secondary-amino-alkylamine, sodium tertiary-amino- or secondary-amino-alkoxide. The 7-halo compound also can be catalytically reduced to remove the 7-halo substituent to yield the corresponding 7-unsubstituted-4-oxo-1-[Z-(aliphatic-hydrocarbyl)] - 1,8 - naphthyridine-3-carboxylic acid and derivatives.

As pointed out above, the 4-oxo-1-substituted-1,8-naphthyridine-3-carboxylic acids are useful for the preparation of their salt, ester, amide and hydrazide derivatives using methods for converting carboxylic acids into said derivatives. These methods are illustrated in the specific exemplary disclosure hereinbelow. These derivatives also have antibacterial and sedative properties, as illustrated in the specific examples below.

The lower-alkyl esters of our 4-oxo-1-substituted-1,8-naphthyridine-3-carboxylic acids, especially methyl and ethyl esters, are useful in their reaction with hydrazines and ammonia or amines to form the corresponding hydrazides and amides, respectively. Also, they can be reacted with higher homologous alkanols, e.g., n-butanol, 1,3-dimethylhexanol, n-decanol, or with an aminoalcohol, e.g., 3-(1-piperidyl)propanol or 4-dimethylaminobutanol, by an ester exchange reaction to yield the corresponding higher alkyl or aminoalkyl ester, e.g., n-butyl, 1,3-dimethylhexyl, n-decyl, 3-(1-piperidyl)propyl or 4-dimethylaminobutyl ester, respectively.

Our invention also includes the intermediate 4-hydroxy-7-[2-(lower-aromatic)ethenyl]-1,8-naphthyridine - 3 - carboxylic acids and derivatives. These compounds are prepared by reacting the corresponding lower-alkyl 4-hydroxy-7-methyl-1,8-naphthyridine-3-carboxylate with a lower-aromatic-aldehyde, e.g., benzaldehyde, or pyridine-2-aldehyde, in the presence of a mixture of a lower-alkanoic acid and anhydride, e.g., acetic acid and acetic anhydride, preferably by heating in the range of about 100° C. to about 150° C., thereby yielding the corresponding lower-alkyl 4-hydroxy-7-[2-(lower-aromatic)ethenyl]-1,8-naphthyridine-3-carboxylate, e.g., the corresponding 7-(2-phenylethenyl) (i.e., 7-styryl) or 7-[2-(2-pyridyl)ethenyl] ester. The corresponding acid is obtained by saponification of the ester and, in turn, can be converted into other esters or salt, amide or hydrazine derivatives, e.g., those defined hereinabove for our 1-substituted-4-oxo-1,8-naphthyridine-3-carboxylic acids. The instant application claims said intermediate 4-hydroxy-7-[2-(lower-aromatic)ethenyl]-1,8-naphthyridine-3-carboxylic acids and derivatives. The foregoing and subsequently described final product embodiments of our invention and their preparation are disclosed and claimed in our copending continuation application Serial Number 244,886, filed December 17, 1962.

Our 4-oxo-1-substituted - 1,8 - naphthyridine-3-carboxylic acids and derivatives when containing a basic moiety, i.e., a lower-tertiary- or -secondary-amino moiety, for example, a 2-diethylaminoethyl ester, a 1-[3-(1-piperidyl)propyl] compound or a 7-(4-n-propylaminobutoxy) compound, are useful both in the free base form and in the form of acid-addition salts; and both forms are within the purview of the invention, and, in fact, are considered to be one and the same invention. The acid-addition salts are simply a more convenient form for use; and in practice, use of the salt form inherently amounts to use of the base form. The acids which can be used to prepare the acid-addition salts include preferably those which produce, when combined with the free base, medicinally acceptable salts, that is, salts whose anions are relatively innocuous to the animal organism in medicinal doses of the salts, so that the beneficial physiological or antibacterial properties inherent in the free base are not vitiated by side effects ascribable to the anions. In practicing our invention, we found it convenient to form the hydrochloride salts. However, other appropriate medicinally acceptable salts within the scope of the invention are those derived from mineral acids such as hydrobromic acid, hydroiodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, acetate, citrate, tartrate, lactate, methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred, all acid-addition salts are within the scope of our invention. All acid-addition salts are useful as sources of the free base form even if the particular salt per se is desired only as an intermediate product as for example when the salt is formed only for purposes of purification or identification, or when it is used as an intermediate in preparing a medicinally acceptable salt by ion exchange procedures.

The molecular structures of the final products and intermediates of my invention are established by their mode of synthesis and confirmed by the correspondence of calculated and found values for the elementary analyses for representative examples and by infrared and ultraviolet spectral analyses.

Our 1-[Z-(aliphatic-hydrocarbyl)]-4-oxo-1,8-naphthyridine-3-carboxylic acids and derivatives when tested according to standard in vitro bacteriological evaluation procedures possess antibacterial activity, for example, against organisms such as *Staphylococcus aureus*, *Eberthella typhi*, *Clostridium welchii*, as illustrated below in the examples. Preferred embodiments also were found to have significant in vivo activity against gram-negative bacteria, e.g., *Klebsiella pneumoniae*, *Salmonella typhimurium*, in mice when administered orally and/or subcutaneously at dose levels in the range of about 100 to 400 mg. per kg. per day. Embodiments were found to increase the hexobarbital-induced sleeping time in mice when administered intraperitoneally forty minutes before intraperitoneal administration of 40 mg. per kg. of hexobarbital. Results in the following examples are given in terms of the number of animals caused to exhibit a loss of righting reflex for one minute or more at a given dose level, e.g., 200 mg. per kg. or in terms of $ED_{50}$, i.e., the effective dose in mg. per kg. that causes fifty percent of the animals to exhibit a loss of righting reflex for one minute or more. Positive results in this barbital-potentiating test indicate the compound tested has central nervous system depressant activity and is useful as a potentiator for barbiturates.

The following examples will further illustrate the invention without, however, limiting it thereto.

Example 1

1-ethyl-7-methyl-4-oxo-1,8-naphthyridine-3-carboxylic acid was prepared as follows: A mixture containing 11.6 g. of 4-hydroxy-7-methyl-1,8-naphthyridine-3-carboxylic acid, 11.1 g. of potassium hydroxide, 230 cc. of ethanol (95% here and elsewhere unless otherwise indicated) and 81 cc. of water was refluxed until the solids dissolved. To this solution was added 28 cc. of ethyl iodide and the resulting mixture was refluxed for 5 days. The reaction mixture was cooled in an ice bath; and the resulting precipitate was collected, recrystallized from acetic acid, washed with water and dried in a vacuum oven (at about 70° C.) to yield 8.7 g. (66% yield) of the crystalline product, 1-ethyl-7-methyl-4-oxo-1,8-naphthyridine-3-carboxylic acid, M.P. 226.8–230.2° C. (corr.).

Analysis.—Calcd. for $C_{12}H_{12}N_2O_3$: C, 62.05; H, 5.21; N, 12.06; N.E. (neutral equivalent), 232. Found: C, 62.12; H, 5.47; N, 11.92; N.E., 229.

The foregoing preparation was carried out using a shorter reaction period as follows: A warm solution containing 41 g. of 4-hydroxy-7-methyl-1,8-naphthyridine-3-carboxylic acid and 39 g. of potassium hydroxide in one later of ethanol and 200 cc. of water was treated with 50 cc. of ethyl iodide and the resulting mixture was refluxed gently overnight, acidified with hydrochloric acid and cooled. The resulting precipitate was collected and recrystallized twice from acetonitrile to yield 26 g. (56% yield) of 1-ethyl-7-methyl-4-oxo-1,8-naphthyridine-3-carboxylic acid, M.P. 229–230° C.

1-ethyl-7-methyl-4-oxo-1,8-naphthyridine-3-carboxylic acid when tested according to standard in vitro bacteriological evaluation procedures was found to possess antibacterial activity, for example, as follows:

| Organism | Log Reciprocal Minimum Effective Concentration (mg./cc.) | |
|---|---|---|
| | Bacteriostatic | Bactericidal |
| Staphylococcus aureus | 4.3 | <3.3 |
| Eberthella typhi | 4.3 | 3.9 |
| Clostridium welchii | 4.6 | <3.3 |

1-ethyl-7-methyl-4-oxo-1,8-naphthyridine-3-carboxylic acid was found to have significant in vivo activity against *Klebsiella pneumoniae* in mice when administered orally or subcutaneously at dose levels as low as 100 mg. per kg. per day and, also, against *Salmonella typhimurium* in mice when administered subcutaneously at a dose level as low as 100 mg. per kg. per day. This compound when tested according to the procedure described hereinabove for potentiation of hexobarbital sleeping time in mice was found to have an $ED_{50}$ of less than 50 mg. per kg. This same compound was found to have an acute oral toxicity ($LD_{50}$) in mice of 4000 mg. per kg. after 24 hours and 3300±975 after 7 days and an acute subcutaneous toxicity ($LD_{50}$) in mice of 500±52 mg. per kg.

Example 2

Sodium 1-ethyl-7-methyl-4-oxo-1,8-naphthyridine-3-carboxylate was prepared by warming on a steam bath a mixture of 6.9 g. of 1-ethyl-7-methyl-4-oxo-1,8-naphthyridine-3-carboxylic acid, 1.1 g. of sodium hydroxide and 150 cc. of ethanol until dissolution resulted. The warm solution was filtered, the filtrate allowed to cool, and the solid collected and air-dried. There was thus obtained 7.5 g. of sodium 1-ethyl-7-methyl-4-oxo-1,8-naphthyridine-3-carboxylate, M.P. 270.6–272.0° C. (corr.) with decomposition.

Analysis.—Calcd. for $C_{12}H_{11}N_2NaO_3$: N, 11.02; Na, 9.06. Found: $H_2O$, 5.95; N (dry basis), 10.68; Na (dry basis), 9.00.

Sodium 1-ethyl-7-methyl-4-oxo-1,8-naphthyridine-3-carboxylate was found to have significant in vivo activity against *Klebsiella pneumoniae* in mice when administered orally at dose levels as low as 100 mg. per kg. per day.

Example 3

Calcium 1-ethyl-7-methyl-4-oxo-1,8-naphthyridine-3-carboxylate was prepared as follows: To a solution containing 12 g. of 1-ethyl-7-methyl-4-oxo-1,8-naphthyridine-3-carboxylic acid, 25 cc. of 10% aqueous potassium hydroxide solution and 300 cc. of water was added with stirring a solution containing 30 g. of calcium acetate dihydrate. The reaction mixture was stirred at room temperature for about 10 minutes; and the resulting precipitate was collected, washed with water and air-dried. The solid was recrystallized once from methanol-water (4:1), a second time from methanol-water (5:1), and then air-dried to yield 5.5 g. of calcium di-(1-ethyl-7-methyl-4-oxo-1,8-naphthyridine-3-carboxylate), M.P. >300° C. (corr.).

Analysis.—Calcd. for $C_{24}H_{22}CaN_4O_6$: C, 57.40; H, 4.40; N, 11.14. Found: C, 57.16; H, 4.67; N, 11.35.

Calcium di-(1-ethyl-7-methyl-4-oxo-1,8-naphthyridine-3-carboxylate) was found to have significant in vivo activity against *Klebsiella pneumoniae* in mice when administered orally at a dose level as low as 100 mg. per kg. per day. This same compound when tested according to the procedure described hereinabove for potentiation of hexobarbital sleeping time in mice was found to have an $ED_{50}$ of 120±20 mg. per kg.

Example 4

1,7-dimethyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 49 g. of potassium hydroxide, 400 cc. of ethanol, 140 cc. of water, 55 cc. of methyl iodide and a reflux period of 5 days. The reaction mixture was cooled in an ice bath and the solid that separated was collected, washed twice with acetone and dried in a vacuum oven (about 70° C.). The solid was dissolved in water, boiled with decolorizing charcoal and filtered. The filtrate was acidified with concentrated hydrochloric acid and the resulting white precipitate was collected and recrystallized twice from dimethylformamide to yield 11.0 g. of 1,7-dimethyl-4-oxo-1,8-naphthyridine-3-carboxylic acid, M.P. >300° C. (corr.).

Analysis.—Calcd. for $C_{11}H_{10}N_2O_3$: N, 12.84; N.E., 218. Found: N, 12.71; N.E., 219.

1,7-dimethyl-4-oxo-1,8-naphthyridine-3-carboxylic acid when tested according to standard in vitro bacteriological evaluation procedures was found to possess antibacterial activity, for example, to have bacteriostatic (Bs) and bactericidal (Bc) values (given here and hereinafter as log recipirical minimum effective concentrations, mg. per cc.) of 4.0 and 3.12, respectively, against *Clostridium welchii*.

Example 5

7-methyl-4-oxo-1-n-propyl-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-propyl iodide and a reflux period of 6 days. The reaction mixture was cooled and the solid that separated was collected and recrystallized from ethanol to yield 17.7 g. (72%) of 7-methyl-4-oxo-1-n-propyl-1,8-naphthyridine-3-carboxylic acid, M.P. 209.4–210.2° C. (corr.)

Analysis.—Calcd. for $C_{13}H_{14}N_2O_3$: C, 63.40; H, 5.73; N, 11.38. Found: C, 63.67; H, 5.87; N, 11.25.

7-methyl-4-oxo-1-n-propyl-1,8-naphthyridine-3-carboxylic acid when tested according to standard in vitro bacteriological evaluation procedures was found to possess antibacterial activity, for example, to have Bs and Bc values, respectively, of 4.3 and <3.0 against *Staphylococcus aureus*, of 5.0 and 3.6 against *Eberthella typhi* and of 5.0 and 4.0 against *Clostridium welchii*. This same compound was found to have significant in vivo activity against *Klebsiella pneumoniae* in mice when administered orally or subcutaneously at a dose level as low as 100 mg. per kg. per day and, also, against *Salmonella typhimurium* in mice when administered orally at a dose level as low as 200 mg. per kg. per day.

*Example 6*

1-n-butyl-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-butyl bromide and a reflux period of 5 days. The reaction mixture was cooled in an ice bath and the resulting precipitate was collected, washed with acetone and recrystallized twice from ethanol to yield about 14. g. of the product, 1-n-butyl-7-methyl-4-oxo - 1,8 - naphthyridine-3-carboxylic acid, M.P. 220.4–222.0° C. (corr.)

*Analysis.*—Calcd. for $C_{14}H_{16}N_2O_3$: N, 10.77; N.E., 260. Found: N, 10.69; N.E., 258.

1-n-butyl-7-methyl-4-oxo-1,8-naphthyridine-3-carboxylic acid when tesetd according to standard in vitro bacteriological evaluation procedures was found to possess antibacterial activity for example, to have Bs and Bc values (as defined hereinabove) of 3.6 and 3.12 against *Eberthella typhi*.

*Example 7*

1-isobutyl-7-methyl-4-oxo - 1,8 - naphthyridine - 3 - carboxylic acid was prepared following the procedure described in Example 1 using 20.4 g. of 4-hydroxy-7-methyl-1,8-naphthyridine-3-carboxylic acid, 24.5 g. of potassium hydroxide, 400 cc. of ethanol, 140 cc. of water, 45 cc. of isobutyl iodide and a reflux period of 8 days. The reaction mixture was chilled in an ice bath and the solid that separated was collected. The filtrate was acidified with hydrochloric acid, the mixture chilled in an ice bath, and the resulting precipitate collected. The two solid portions were combined and recrystallized three times from acetic acid to yield 7.8 g. of 1-isobutyl-7-methyl-4-oxo-1,8-naphthyridine-3-carboxylic acid, M.P. 234.8–236.8° C. (Corr.).

*Analysis.*—Calcd. for $C_{14}H_{16}N_2O_3$: N, 10.68; N.E., 268. Found: N, 10.77; N.E., 260.

1-isobutyl-7-methyl-4-oxo-1,8-naphthyridine-3-carboxylic acid when tested according to standard in vitro bacteriological evaluation procedures was found to possess antibacterial activity, for example to have Bs and Bc values, respectively, of 4.3 and 3.6 against *Staphylococcus aureus*, of 4.3 and 3.3 against *Eberthella typhi* and of 4.6 and 3.0 against *Clostridium welchii*. This same compound when tested as described above was found to potentiate hexobarbital sleeping time in three out of six mice at a dose level of 200 mg. per kg.

*Example 8*

7-methyl-4-oxo-1-n-pentyl-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-pentyl iodide and a reflux period of 5 days. The reaction mixture was cooled in an ice bath and the resulting precipitate was collected and recrystallized twice from isopropyl alcohol, the second time using decolorizing charcoal. There was thus obtained 4.1 g. of 7-methyl-4-oxo-1-n-pentyl-1,8-naphthyridine-3-carboxylic acid, M.P. 171.4–172.8° C. (corr.).

*Analysis*—Calcd. for $C_{15}H_{18}N_2O_3$: C, 65.69; H, 6.62; N, 10.18. Found: C, 66.01; H, 6.57; N, 10.15.

7-methyl-4-oxo-1-n-pentyl-1,8-naphthyridine-3-carboxylic acid when tested according to standard in vitro bacteriological evaluation procedures was found to possess antibacterial activity, for example, to have Bs and Bc values, respectively, of 4.12 and 3.12 against *Staphylococcus aureus* and of 4.12 and 3.3 against *Clostridium welchii*.

*Example 9*

1-n-hexyl-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-hexyl iodide and a reflux period of 5 days. The reaction mixture (pH 6.4) was made more acidic with concentrated hydrochloric acid and chilled in an ice bath. The resulting precipitate was collected and recrystallized twice from isopropyl alcohol, the second time using decolorizing charcoal. There was thus obtained 8.6 g. of the product, 1-n-hexyl-7-methyl-4-oxo - 1,8 - naphthyridine - 3-carboxylic acid, a pale yellow solid, M.P. 146.2–148.2° C. (corr.).

*Analysis.*—Calcd. for $C_{16}H_{20}N_2O_3$: C, 66.64; H. 6.99; N, 9.72. Found: C, 66.93; H, 6.88; N, 960.

1-n-hexyl-7-methyl-4-oxo-1,8-naphthyridine-3-carboxylic acid when tested according to standard in vitro bacteriological evaluation procedures was found to possess antibacterial activity for example, to have Bs and Bc values, respectively, of 4.6 and 3.0 against *Staphylococcus aureus*, of 5.0 and 4.12 against *Clostridium welchii* and of 4.12 and 4.12 against *Mycobacterium tuberculosis*.

*Example 10*

1-n-decyl-7-methyl-4-oxo - 1,8 - naphthyridine - 3 - carboxylic acid was prepared following the procedure described in Example 1 using 10.2 g. of 4-hydroxy-7-methyl-1,8-naphthyridine-3-carboxylic acid, 9.8 g. of potassium hydroxide, 200 cc. ethanol, 70 cc. of water, 20 cc. n-decyl bromide, 1 g. of potassium iodide and a reflux period of 6 days. The reaction mixture was acidified with concentrated hydrochloric acid and chilled in an ice bath. The resulting precipitate was collected, recrystallized once from ethanol using decolorizing charcoal and a second time from ethanol to yield 5.8 g. of the product, 1-n-decyl-7-methyl-4-oxo-1,8-naphthyridine-3 - carboxylic acid, M.P. 129.2–130.4° C. (corr.).

*Analysis.*—Calcd. for $C_{20}H_{28}N_2O_3$: C, 69.74; H, 8.19; N, 8.13. Found: C, 70.19, 69.86; H, 8.04, 8.00; N, 8.21.

*Example 11*

5,7-dimethyl-1-ethyl-4-oxo-1,8-naphthyridine - 3 - carboxylic acid was prepared by refluxing for 4 hours a mixture containing 21.8 g. of 5,7-dimethyl-4-hydroxy-1,8-naphthyridine-3-carboxylic acid, 120 cc. of 10% aqueous potassium hydroxide solution, 300 cc. of ethanol and 25 cc. of ethyl iodide. The reaction mixture was made acidic and the resulting precipitate was collected, recrystallized from acetic acid-water and then from acetic acid to yield 10.6 g. of 5,7-dimethyl-1-ethyl-4-oxo-1,8-naphthyridine-3-carboxylic acid, as yellow needles, M.P. 243.6–244.8° C. (corr.)

*Analysis.*—Calcd. for $C_{13}H_{14}N_2O_3$: N, 11.38; N.E., 246. Found: N, 11.11; N.E., 240.

5,7-dimethyl - 1 - ethyl-4-oxo-1,8-naphthyridine-3-carboxylic acid when tested according to standard in vitro bacteriological evaluation procedures was found to possess antibacterial activity, for example, to have Bs and Bc values, respectively, of 4.6 and 3.12 against *Eberthella typhi*, of 5.3 and 3.6 against *Clostridium welchii* and of 4.0 and 3.6 against *Mycobacterium tuberculosis*.

The intermediate 5,7-dimethyl-4-hydroxy-1,8-naphthyridine-3-carboxylic acid was prepared in several steps starting with 2-amino-4,6-dimethylpyridine as follows: A mixture containing 92 g. of 2-amino-4,6-dimethylpyridine and 166 g. of ethoxymethylenemalonic ester was heated for 2 hours on a steam bath. The ethanol formed by the reaction was distilled off in vacuo and the remaining material was poured into an evaporating dish and cooled. The resulting solid was recrystallized two times from ethanol to yield 170 g. of diethyl N-(4,6-dimethyl-2-pyridyl)aminomethylenemalonate, M.P. 96.8–98.6° C. (corr.)

Analysis.—Calcd. for $C_{15}H_{20}N_2O_4$: C, 61.62; H, 6.90; N, 9.59. Found: C, 61.52; H, 7.07; N, 9.55.

A mixture containing 29.2 g. of diethyl N-(4,6-dimethyl-2-pyridyl)aminomethylenemalonate and 180 cc. of Dowtherm A (eutectic mixture of diphenyl and diphenyl ether) was refluxed for about 30 minutes and allowed to cool. The solid that separated was collected, washed with benzene and recrystallized from ethanol using decolorizing charcoal. There was thus obtained, as a yellow solid, ethyl 5,7 - dimethyl - 4 - hydroxy - 1,8 - naphthyridine-3-carboxylate, M.P. 235.8–236.6° C. (corr.).

Analysis.—Calcd. for $C_{13}H_{14}N_2O_3$: C, 63.40; H, 5.73; N, 11.38. Found: C, 63.66; H, 5.75; N, 11.16.

A mixture containing 49 g. of ethyl 5,7-dimethyl-4-hydroxy-1,8-naphthyridine - 3 - carboxylate, 450 cc. of 10% aqueous potassium hydroxide solution and 250 cc. of ethanol was heated on a steam bath for about 2 hours after which the volume of the reaction mixture had been reduced to about 500 cc. The resulting solution was poured into a solution containing 150 cc. of 6 N hydrochloric acid and about 1 liter of water. The yellow solid that separated was collected and washed successively with water, ethanol and ether, and then dried in vacuo at 60° C. to yield 45 g. of 5,7-dimethyl-4-hydroxy-1,8-naphthyridine-3-carboxylic acid, a yellow solid, M.P. 285° C. with decomposition.

*Example 12*

6 - bromo - 1 - ethyl - 7 - methyl - 4 -oxo - 1,8 - naphthyridine-3-carboxylic acid was prepared as follows: A mixture containing 14.2 g. of 6-bromo-4-hydroxy-7-methyl-1,8-naphthyridine-3-carboxylic acid, 9.8 g. of potassium hydroxide, 230 cc. of ethanol and 80 cc. of water was refluxed until the solids dissolved. To this solution was added 20 cc. of ethyl iodide and the resulting reaction mixture was refluxed on a steam bath for 19 hours. The reaction mixture was then cooled in an ice bath and the resulting precipitate was collected, washed with acetone, recrystallized from dimethylformamide, washed with acetone and dried in a vacuum oven (70° C.) to yield 10.7 g. of 6-bromo-1-ethyl-7-methyl-4-oxo-1,8-naphthyridine-3-carboxylic acid, M.P. 279.6–280° C. (corr.) with decomposition.

Analysis.—Calcd. for $C_{12}H_{11}BrN_2O_3$: Br, 25.69; N, 9.00. Found: Br, 25.50; N, 9.28.

6 - bromo - 1 - ethyl - 7 - methyl - 4 - oxo - 1,8 - naphthyridine-3-carboxylic acid when tested according to standard in vitro bacteriological evaluation procedures was found to possess antibacterial activity, for example, to have Bs and Bc values, respectively, of 4.6 and 3.0 against *Staphylococcus aureus*, of 4.12 and 3.6 against *Eberthella typhi* and of 4.6 and 3.3 against *Clostridium welchii*.

The intermediate 6-bromo-4-hydroxy-7-methyl-1,8-naphthyridine-3-carboxylic acid was prepared in several steps starting with 6-amino-3-bromo-2-methylpyridine as follows: A mixture containing 91.4 g. of 6-amino-3-bromo-2-methylpyridine and 105.5 g. of diethyl ethoxymethylenemalonate was heated under vacuum on a steam bath overnight (about 15 hours). The reaction mixture, which had solidified to a yellow solid, was recrystallized from ethanol to yield 121.5 g. of diethyl N-(5-bromo-6-methyl-2-pyridyl)aminomethylenemalonate, M.P. 133–134.5° C. For analysis a 20 gram portion was recrystallized a second time from 95% ethanol and dried in a vacuum oven whereupon there was obtained 18.3 g. of the white crystalline product having the same melting point, the corrected melting point being 130.8–132.6° C.

Analysis.—Calcd. for $C_{14}H_{17}BrN_2O_4$: Br, 22.37; N, 7.85. Found: Br, 22.50; N, 7.94.

Dowtherm A. (700 cc.) was heated to reflux with stirring and to it was added 101.4 g. of diethyl N-(5-bromo-6-methyl-2-pyridyl)aminomethylenemalonate dissolved in 200 cc. of warm Dowtherm A. The reaction mixture was then refluxed for 2 hours, allowed to cool and then allowed to stand overnight at room temperature. The solid that separated was collected and washed successively with n-pentane and acetone, dried in an oven at about 80° C. and recrystallized from dimethylformamide using decolorizing charcoal to yield 26.8 g. of ethyl 6-bromo - 4 - hydroxy - 7 - methyl - 1,8 - naphthyridine-3-carboxylate, M.P. 288–289° C. with decomposition.

The foregoing ester was hydrolyzed to the corresponding acid as follows: A mixture containing 26.8 g. of ethyl 6 - bromo - 4 - hydroxy - 7 - methyl - 1,8 - naphthyridine-3-carboxylate and 145 cc. of 10% aqueous potassium hydroxide solution was refluxed for 2 hours and then allowed to stand at room temperature overnight. The reaction mixture was then brought to boiling and filtered to remove a small amount of tan solid. The filtrate was cooled and acidified with hydrochloric acid to yield a copious pale yellow precipitate. The mixture was chilled in an ice bath and the yellow solid was collected, washed with water and dried to yield 21.0 g. of 6-bromo-4-hydroxy-7-methyl-1,8-naphthyridine-3-carboxylic acid, M.P. 294–296° C. with decomposition.

*Example 13*

6 - bromo-5,7-dimethyl-1-ethyl-4-oxo-1,8-naphthyridine-3-carboxylic acid was prepared as follows: A mixture containing 31 g. of ethyl 6-bromo-5,7-dimethyl-4-hydroxy-1,8-naphthyridine-3-carboxylate, 98 cc. of 10% aqueous potassium hydroxide solution, 400 cc. of ethanol, 500 cc. of water and 15 cc. of ethyl iodide was refluxed for 3 hours. An additional 1 liter of ethanol, 1 liter of water, 50 cc. of 10% aqueous potassium hydroxide solution and about 10 cc. of ethyl iodide were added and refluxing was continued for an additional 2 hours. The reaction mixture was then poured into 1 liter of water containing 100 cc. of 6 N hydrochloric acid. The finely divided precipitate that separated was collected, dried in a vacuum oven at 60° C. for about 4 hours and then recrystallized from dimethylformamide to yield 20.5 g. of 6-bromo-5,7-dimethyl-1-ethyl-4-oxo-1,8-naphthyridine-3-carboxylic acid, M.P. 235.2–237.8° C. (corr.).

Analysis.—Calcd. for $C_{13}H_{13}BrN_2O_3$: Br, 24.58; N, 8.61. Found: Br, 24.40; N, 8.87.

The intermediate ethyl 6-bromo-5,7-dimethyl-4-hydroxy-1,8-naphthyridine-3-carboxylate was prepared in several steps starting with 6-amino-3-bromo-2,4-dimethylpyridine as follows: A mixture of 84.5 g. of 6-amino-3-bromo-2,4-dimethylpyridine and 93 g. of diethyl ethoxymethylenemalonate was heated on a steam bath for 1 hour. To the reaction mixture, which had caked, was added about 500 cc. of ethanol and the resulting mixture was refluxed and then allowed to cool to room temperature. The solid that separated was collected and washed with ethanol. There was thus obtained 125 g. of diethyl N-(5 - bromo - 4,6 - dimethyl-2-pyridyl)aminomethylenemalonate, M.P. 134–135.5° C. A 19 gram sample was recrystallized from ethanol to yield 17 g. of the product having the same melting point, the corrected M.P. being 132.6–133.4° C.

Analysis.—Calcd. for $C_{15}H_{19}BrN_2O_4$: Br, 21.53; N, 7.55. Found: Br, 21.53; N, 7.60.

A mixture containing 45 g. of diethyl N-(5-bromo-4,6-dimethyl-2-pyridyl)aminomethylenemalonate and 360 cc. of Dowtherm A was refluxed with stirring at the temperature of 250–252° C. Refluxing was continued for about 75 minutes and the ethanol formed by the reaction was removed by distillation. The cooled reaction mixture was filtered and the solid thus obtained was washed with benzene and n-pentane to yield 31 g. of the product. The 31 g. of product was combined with a 27 g. portion obtained in another run and the mixture was recrystallized from dimethylformamide and subsequently triturated with ethanol and dried to yield 48 g. of product, ethyl 6-bromo-5,7-dimethyl-4-hydroxy-1,8-naphthyridine- 3-carboxylate, M.P. 282.0–284° C. (corr.) with decomposition.

*Analysis.*—Calcd. for $C_{13}H_{13}BrN_2O_3$: Br, 24.58; N, 8.62. Found: Br, 24.30; N, 8.66.

6-bromo-5,7-dimethyl-1-ethyl-4-oxo-1,8-naphthyridine-3-carboxylic acid when tested according to standard in vitro bacteriological evaluation procedures was found to possess antibacterial activity, for example, to have Bs and Bc values, respectively, of 5.3 and 4.12 against *Staphylococcus aureus*, of 4.3 and 3.12 against *Eberthella typhi* and of 5.12 and 3.3 against *Clostridium welchii*.

Example 14

1-ethyl-7-methyl-4-oxo-1,8-naphthyridine-3-carboxylic acid hydrazide was prepared as follows: A mixture of 17 g. of ethyl 1-ethyl-7-methyl-4-oxo-1,8-naphthyridine-3-carboxylate and 75 cc. of hydrazine hydrate was heated on a steam bath for about 15 minutes, cooled and allowed to stand at room temperature overnight. The reaction mixture was then heated to near boiling for about 5 minutes and cooled; the resulting precipitate was collected, recrystallized twice from isopropyl alcohol, the second time using decolorizing charcoal, and air-dried to yield 14 g. of the product, 1-ethyl-7-methyl-4-oxo-1,8-naphthyridine-3-carboxylic acid hydrazide, M.P. 184.2–186.0° C. (corr.).

*Analysis.*—Calcd. for $C_{12}H_{14}N_4O_2$: C, 58.50; H, 5.74; N, 22.76. Found: C, 58.40; H, 5.72; N, 23.03.

1-ethyl-7-methyl-4-oxo-1,8-naphthyridine-3-carboxylic acid hydrazide when tested as described above for potentiation of hexobarbital sleeping time in mice was found to have an $ED_{50}$ of $65\pm11$ mg. per kg.

Example 15

1-ethyl-7-methyl-4-oxo-1,8-naphthyridine-3-carboxamide was prepared as follows: A reaction mixture containing 7.5 g. of 1-ethyl-7-methyl-4-oxo-1,8-naphthyridine-3-carboxylic acid hydrazide, 80 g. of Raney nickel and 150 cc. of ethanol was refluxed on a steam bath for 4 hours, and then allowed to cool to room temperature and stand overnight. The reaction mixture was heated to boiling, the catalyst filtered off, and the filtrate evaporated to dryness. The resulting crystalline material was recrystallized from acetic acid-water (1:1) and washed with acetone to yield 3 g. of the product, 1-ethyl-7-methyl-4-oxo-1,8-naphthyridine-3-carboxamide, M.P. 224.8–246.4° C.

*Analysis.*—Calcd. for $C_{12}H_{13}N_3O_2$: C, 62.36; H, 5.66; N, 18.16. Found: C, 62.23; H, 5.60; N, 17.90.

1-ethyl-7-methyl-4-oxo-1,8-naphthyridine-3-carboxamide was found to have significant in vivo activity against *Klebsiella pneumoniae* in mice when administered subcutaneously at a dose level of 200 mg. per kg. per day.

Example 16

Ethyl 1-ethyl-7-methyl-4-oxo-1,8-naphthyridine-3-carboxylate was prepared as follows: A 6.9 g. portion of sodium was dissolved in 300 cc. of absolute ethanol (to produce a solution of sodium ethoxide in ethanol) and to the resulting solution was added 23.2 g. of ethyl 4-hydroxy-7-methyl-1,8-naphthyridine-3-carboxylate. The reaction mixture was brought to reflux on a steam bath and to the resulting suspension was added 35 cc. of ethyl iodide. The resulting reaction mixture was refluxed for 16 hours and chilled in an ice bath; and, when no solid separated, it was evaporated to about one-third its volume on a steam bath under reduced pressure, acidified, diluted and shaken well with four volumes of water, and filtered. The solid that separated from the filtrate was collected and recrystallized three times from ethyl acetate, the second time using decolorizing charcoal. There was thus obtained 7.0 g. of the product, ethyl 1-ethyl-7-methyl-4-oxo-1,8-naphthyridine-3-carboxylate, M.P. 120.8–121.6° C. (corr.).

*Analysis.*—Calcd. for $C_{14}H_{16}N_2O_3$: C, 64.60; H, 6.19; N, 10.77. Found: C, 64.58; H, 6.03; N, 10.93.

Ethyl 1-ethyl-7-methyl-4-oxo-1,8-naphthyridine-3-carboxylate was found to have significant in vivo activity against *Klebsiella pneumoniae* in mice when administered orally or subcutaneously at dose levels as low as 100 mg. per kg. per day.

Example 17 n-Butyl 1-ethyl-7-methyl-4-oxo-1,8-naphthyridine-3-carboxylate was prepared as follows: A mixture containing 13 g. of ethyl 1-ethyl-7-methyl-4-oxo-1,8-naphthyridine-3-carboxylate, 25 cc. of n-butanol and 0.3 g. of sodium methoxide was heated in an oil bath at about 122–125° C. for a period of 48 hours. The reaction mixture was then cooled, filtered, and the filtrate concentrated in vacuo to remove the solvent. The remaining reaction mixture solidified on cooling. The solid was collected and recrystallized from cyclohexane using decolorizing charcoal. The air-dried product, n-butyl 1-ethyl-7-methyl-4-oxo-1,8-naphthyridine-3-carboxylate, M.P. 98.0–99.4° C. (corr.), weighed 8.8 g. (61% yield).

*Analysis.*—Calcd. for $C_{16}H_{20}N_2O_3$: C, 66.66; H, 6.98; N, 9.71. Found: C, 66.49; H, 6.72; N, 9.64.

n-Butyl 1-ethyl-7-methyl-4-oxo-1,8-naphthyridine-3-carboxylate when tested as described above was found to potentiate hexobarbital sleeping time in six out of six mice at a dose level of 200 mg. per kg. This same compound was found to have significant in vivo activity against *Klebsiella pneumoniae* in mice when administered orally at a dose level of 100 mg. per kg. per day.

Example 18

1,3-dimethylbutyl 1-ethyl-7-methyl-4-oxo-1,8-naphthyridine-3-carboxylate was prepared as follows: A mixture containing 11 g. of ethyl 1-ethyl-7-methyl-4-oxo-1,8-naphthyridine-3-carboxylate, 25 cc. of 4-methyl-2-pentanol and 0.1 g. of sodium methoxide was heated for about 16 hours in an oil bath kept at about 130–135° C. The reaction mixture was cooled, filtered, and concentrated in vacuo to remove the slovent. The resulting solidified reaction mixture was recrystallized twice from cyclohexane, once from diisopropyl ether, washed with n-pentane and dried in vacuo at 70° C. to yield 6.5 g. of product, 1,3-dimethylbutyl 1-ethyl-7-methyl-4-oxo-1,8-naphthyridine-3-carboxylate, M.P. 114.6–119.4° C. (corr.).

*Analysis.*—Calcd. for $C_{18}H_{24}N_2O_3$: C, 68.36; H, 7.64; N, 8.84. Found: C, 68.68; H, 7.25; N, 8.87.

1,3-dimethylbutyl 1-ethyl-7-methyl-4-oxo-1,8-naphthyridine-3-carboxylate when tested as described above for potentiation of hexobarbital sleeping time in mice was found to have an $ED_{50}$ of $152\pm28$ mg. per kg. This same compound was found to have significant in vivo activity against *Klebsiella pneumoniae* in mice when administered orally at a dose level of 100 mg. per kg. per day.

Example 19

2-dimethylaminoethyl 1-ethyl-7-methyl-4-oxo-1,8-naphthyridine-3-carboxylate was prepared as follows: A mixture containing 11 g. of ethyl 1-ethyl-7-methyl-4-oxo-1,8-naphthyridine-3-carboxylate, 25 cc. of 2-dimethylaminoethanol and 0.1 g. of sodium methoxide was heated in an oil bath kept at about 135–140° C. for about 16 hours. The reaction mixture was concentrated in vacuo to remove the solvent and remaining oily material was taken up in chloroform. The chloroform solution was washed twice with water, dried over anhydrous potassium carbonate, treated with decolorizing charcoal, filtered, and concentrated in vacuo to remove the chloroform. The remaining oily material was dissolved in 40 cc. of acetonitrile; to this solution was added 6 cc. of 15% ethanolic hydrogen chloride; and the resulting mixture was cooled. The solid that separated was collected and recrystallized once from acetonitrile and once from isopropyl alcohol. There was thus obtained 3 g. of product, 2-dimethylaminoethyl 1-ethyl-7-methyl-4-oxo-1,8-naphthyridine-3-carboxylate in the form of its hydrochloride, M.P. 228.6–230.2° C. (corr.).

Analysis.—Calcd. for $C_{16}H_{21}N_3O_3 \cdot HCl$: C, 56.52; H, 6.52; Cl, 10.44. Found: C, 56.38; H, 6.55; C, 10.49.

2-dimethylaminoethyl 1-ethyl-7-methyl-4-oxo-1,8-naphthyridine-3-carboxylate hydrochloride when tested as described above was found to potentiate hexobarbital sleeping time in four out of six mice at a dose level of 200 mg. per kg. This same compound was found to have significant in vivo activity against *Klebsiella pneumoniae* in mice when administered orally at a dose level of 200 mg. per kg. per day or subcutaneously at a dose level of 100 mg. per kg. per day.

Example 20

1-benzyl-7-methyl-4-oxo-1,8-naphthyridine-3-carboxylic acid was prepared following the procedure described in Example 1 using 13.3 g. of 4-hydroxy-7-methyl-1,8-naphthyridine-3-carboxylic acid, 12.7 g. of potassium hydroxide, 250 cc. of ethanol, 100 cc. of water, 25 cc. of benzyl chloride and a reflux period of 16 hours. There was thus obtained 7.5 g. of the product, 1-benzyl-7-methyl-4-oxo-1,8-naphthyridine-3-carboxylic acid, M.P. 255.2–256.8° C. (corr.) after triturating the crude reaction mixture with boiling water and then recrystallizing it from acetic acid using decolorizing charcoal.

Analysis.—Calcd. for $C_{17}H_{14}N_2O_3$: N, 9.52; N.E., 294. Found: N, 9.41; N.E. 286.

1-benzyl-7-methyl-4-oxo-1,8-naphthyridine-3-carboxylic acid when tested according to standard in vitro bacteriological evaluation procedures was found to possess antibacterial activity, for example, to have Bs and Bc values, respectively, of 4.3 and 3.6 against *Staphylococcus aureus* and of 4.0 and 3.3 against *Clostridium welchii*.

Example 21

1-(2-chlorobenzyl)-7-methyl-4-oxo-1,8-naphthyridine-3-carboxylic acid was prepared following the procedure described in Example 1 using 12.2 g. of 4-hydroxy-7-methyl-1,8-naphthyridine-3-carboxylic acid, 11.7 g. of potassium hydroxide, 230 cc. of ethanol, 95 cc. of water, 19.3 g. of 2-chlorobenzyl chloride and a reflux period of 6 hours. The reaction mixture was allowed to stand at room temperature over the week end and then cooled in an ice bath. The solid that separated was collected, recrystallized from acetic acid, washed with acetone and dried in a vacuum oven (70° C.) to yield 11.8 g. of the product, 1-(2-chlorobenzyl)-7-methyl-4-oxo-1,8-naphthyridine-3-carboxylic acid, M.P. 219.6–222.0° C. (corr.) with decomposition.

Analysis.—Calcd. for $C_{17}H_{13}ClN_2O_3$: Cl, 10.79; N, 8.52. Found: Cl, 11.00; N, 8.34.

1-(2-chlorobenzyl)-7-methyl-4-oxo-1,8-naphthyridine-3-carboxylic acid when tested according to standard in vitro bacteriological evaluation procedures was found to possess antibacterial activity, for example, to have Bs and Bc values, respectively, of 5.0 and 3.3 against *Staphylococcus aureus*, of 3.3 and 3.0 against *Eberthella typhi* and of 4.6 and 3.3 against *Clostridium welchii*.

Example 22

1-(3,4-dichlorobenzyl)-7-methyl-4-oxo-1,8-naphthyridine-3-carboxylic acid was prepared following the procedure described in Example 1 using 12.2 g. of 4-hydroxy-7-methyl-1,8-naphthyridine-3-carboxylic acid, 11.7 g. of potassium hydroxide, 230 cc. of ethanol, 95 cc. of water, 23.4 g. of 3,4-dichlorobenzyl chloride and a reflux period of 5 hours. There was thus obtained 11.1 g. (51% yield) of the product, 1-(3,4-dichlorobenzyl)-7-methyl-4-oxo-1,8-naphthyridine-3-carboxylic acid, M.P. 261.6–263.6° C. (corr.) when recrystallized from acetic acid containing ethanolic hydrogen chloride and using decolorizing charcoal.

Analysis.—Calcd. for $C_{17}H_{12}Cl_2N_2O_3$: Cl, 19.53; N, 7.72. Found: Cl, 19.81; N, 7.71.

Example 23

7-methyl-1-(1-naphthylmethyl)-4-oxo-1,8-naphthyridine-3-carboxylic acid was prepared following the procedure described in Example 1 using 12.2 g. of 4-hydroxy-7-methyl-1,8-naphthyridine-3-carboxylic acid, 11.7 g. of potassium hydroxide, 230 cc. of ethanol, 95 cc. of water, 21.2 g. of 1-chloromethylnaphthalene and a reflux period of 6 hours. There was thus obtained 7.0 g. of product, 7-methyl-1-(1-naphthylmethyl)-4-oxo-1,8-naphthyridine-3-carboxylic acid, M.P. 244.6–246.2° C. (corr.) when recrystallized from acetic acid using decolorizing charcoal.

Analysis.—Calcd. for $C_{21}H_{16}N_2O_3$: C, 73.25; H, 4.68; N, 8.13. Found: C, 73.50; H, 4.56; N, 7.99.

Example 24

1-(2-cyclohexylethyl)-7-methyl-4-oxo-1,8-naphthyridine-3-carboxylic acid was prepared as follows: A mixture containing 20.4 g. of 4-hydroxy-7-methyl-1,8-naphthyridine-3-carboxylic acid, 19.5 g. of potassium hydroxide, 385 cc. of ethanol, 150 cc. of water and 40 cc. of 2-cyclohexylethyl bromide was refluxed on a steam bath for about 18 hours. To the basic reaction mixture was added 25 cc. of 22% ethanolic hydrogen chloride; the acidic mixture was cooled in an ice bath; and the resulting precipitate was collected, washed with water, dried in a vacuum oven at 65° C., and recrystallized from absolute ethanol to yield 21.6 g. (69%) of the product, 1-(2-cyclohexylethyl)-7-methyl-4-oxo-1,8-naphthyridine-3-carboxylic acid, M.P. 186.0–187.0° C. (corr.).

Analysis.—Calcd. for $C_{18}H_{22}N_2O_3$: C, 68.76; H, 7.05; N, 8.91. Found: C, 69.06; H, 6.80; N, 9.01.

1-(2-cyclohexylethyl)-7-methyl-4-oxo-1,8-naphthyridine-3-carboxylic acid when tested according to standard in vitro bacteriological evaluation procedures was found to possess antibacterial activity, for example, to have Bs and Bc values, respectively, of 5.0 and 3.3 against *Staphylococcus aureus* and of 4.12 and 3.12 against *Clostridium welchii*.

Example 25

1-(2-ethoxyethyl)-7-methyl-4-oxo-1,8-naphthyridine-3-carboxylic acid was prepared following the procedure described in Example 24 using 20.4 g. of 4-hydroxy-7-methyl-1,8-naphthyridine-3-carboxylic acid, 19.5 g. of potassium hydroxide, 385 cc. of ethanol, 150 cc. of water, 46.0 g. of 2-bromoethyl ethyl ether and a reflux period of about 18 hours. There was thus obtained 12.1 g. (44%) of the product, 1-(2-ethoxyethyl)-7-methyl-4-oxo-1,8-naphthyridine-3-carboxylic acid, M.P. 182.6–183.4° C. (corr.), when recrystallized twice from acetonitrile using decolorizing charcoal and once from dioxane.

Analysis.—Calcd. for $C_{14}H_{16}N_2O_4$: C, 60.85; H, 5.83; N, 10.14. Found: C, 60.87; H, 5.62; N, 10.25.

1-(2-ethoxyethyl)-7-methyl-4-oxo-1,8-naphthyridine-3-carboxylic acid when tested according to standard in vitro bacteriological evaluation procedures was found to possess antibacterial activity, for example, to have Bs and Bc values, respectively, of 3.6 and <3.3 against *Staphylococcus aureus* and of 3.6 and <3.3 against *Clostridium welchii*.

Example 26

1-allyl-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 26 g. of potassium hydroxide, 385 cc. of ethanol, 150 cc. of water, 40 cc. of allyl bromide and a reflux period of 4 hours. There was thus obtained 16.0 g. of the product, 1-allyl-7-methyl-4-oxo-1,8-naphthyridine-3-carboxylic acid, M.P. 207.6–208.2° C. (corr.) when recrystallized from absolute ethanol.

*Analysis.*—Calcd. for $C_{13}H_{12}N_2O_3$: C, 63.93; H, 4.95; N, 11.47. Found: C, 63.87; H, 4.69; N, 11.48.

1 - allyl - 7 - methyl - 4 - oxo - 1,8-naphthyridine - 3 - carboxylic acid when tested according to standard in vitro bacteriological evaluation procedures was found to possess antibacterial activity, for example, to have Bs and Bc values respectively, of 4.3 and 3.6 against *Eberthella typhi* and of 4.12 and 3.0 against *Clostridium welchii*. This same compound was found to have significant in vivo activity against *Klebsiella pneumoniae* in mice when administered orally at a dose level of 400 mg. per day or subcutaneously at a dose level of 200 mg. per kg. per day. Also, when tested for potentiation of hexobarbital sleeping time in mice this compound was found to have an $ED_{50}$ of $60\pm7$ mg. per kg.

Example 27

1 -(2 - chloro - 2 - propenyl) - 7 - methyl - 4 - oxo - 1,8 - naphthyridine-3-carboxylic acid was prepared following the procedure described in Example 1 using 20.4 g. of 4 - hydroxy - 7 - methyl-1,8-naphthyridine-3-carboxylic acid, 19.5 g. of potassium hydroxide, 385 cc. of ethanol, 150 cc. of water, 22.2 g. of 2,3-dichloropropene and a reflux period of 2 hours. There was thus obtained 7.7 g. of the product, 1-(2-chloro-2-propenyl)-7-methyl-4-oxo - 1,8 - naphthyridine - 3-carboxylic acid, M.P. 185.2–186.2° C. (corr.) when recrystallized three times from absolute ethanol.

*Analysis.*—Calcd. for $C_{13}H_{11}ClN_2O_3$: Cl, 12.72; N, 10.05. Found: Cl, 12.56; N, 10.14.

1 - (2 - chloro- 2 - propenyl) - 7 - methyl - 4 - oxo - 1,8-naphthyridine-3-carboxylic acid when tested according to standard in vitro bacteriological evaluation procedures was found to possess antibacterial activity, for example, to have Bs and Bc values, respectively, of 4.3 and 3.3 against *Staphylococcus aureus* and of 4.6 and 3.6 against *Eberthella typhi*. This same compound when tested as described above for potentiation of hexobarbital sleeping time in mice was found to have an $ED_{50}$ of $86\pm15.6$ mg. per kg.

Example 28

7 - methyl - 4 - oxo - 1 - (2 - propynyl) - 1,8 - naphthyridine-3-carboxylic acid was prepared following the procedure described in Example 1 using 20.4 g. of 4-hydroxy - 7 - methyl - 1,8 - naphthyridine-3-carboxylic acid, 19.5 g. of potassium hydroxide, 385 cc. of ethanol, 150 cc. of water, 40 cc. of propargyl bromide and a reflux period of 4 hours. The crude product was recrystallized respectively from methanol, water acidified with hydrochloric acid and acetonitrile using decolorizing charcoal. There was thus obtained 3.5 g. of the product, 7-methyl-4 - oxo - 1 - (2 - propynyl) - 1,8-naphthyridine - 3 - carboxylic acid, M.P. 253.4–254.0° C. (corr.) with decomposition.

*Analysis.*—Calcd. for $C_{13}H_{10}N_2O_3$: C, 64.45; H, 4.17; N, 11.57. Found: C, 64.61; H, 4.45; N, 11.63.

7 - methyl - 4 - oxo - 1 (2 - propynyl) - 1,8 - naphthyridine-3-carboxylic acid when tested according to standard in vitro bacteriological evaluation procedures was found to possess antibacterial activity, for example, to have Bs and Bc values, respectively, of 4.3 and <3.0 against *Eberthella typhi* and of 4.12 and <3.0 against *Clostridium welchii*. This same compound when tested as described above for potentiation of hexobarbital sleeping time in mice was found to have an $ED_{50}$ of $71\pm9.9$ mg. per kg.

Example 29

1 - carboxylmethyl - 7 - methyl - 4 - oxo - 1,8 - naphthyridine-3-carboxylic acid was prepared as follows: 20.4 g. of 4-hydroxy-7-methyl-1,8-naphthyridine-3-carboxylic acid and 19.5 g. of potassium hydroxide were dissolved in 60 cc. of water. To this solution was added 9.5 g. of chloroacetic acid and the resulting solution was evaporated by heating with stirring on a hot plate until a stiff paste was obtained. This required about thirty minutes. The reaction mixture was dissolved in hot water, treated with decolorizing charcoal, filtered, and filtrate acidified with acetic acid. The acidic solution was chilled in an ice bath; and the resulting precipitate was collected, washed with water, dried in a vacuum oven at 65° C. and then recrystallized from 90% aqueous acetic acid. There was thus obtained 16.0 g. (61%) of the product, 1 - carboxy - methyl-7-methyl-4-oxo-1,8-naphthyridine-3-carboxylic acid, M.P. 292.4–294° C. (corr.) with decomposition.

*Analysis.*—Calcd. for $C_{12}H_{10}N_2O_5$: C, 54.96; H, 3.85; N, 10.68. Found: C, 55.22; H, 4.17; N, 10.69.

Example 30

1 - (2 - diethylaminoethyl) - 7 - methyl-4-oxo-1,8-naphthyridine-3-carboxylic acid was prepared as follows: To a solution containing 20.4 g. of 4-hydroxy-7-methyl-1,8-naphthyridine-3-carboxylic acid, 26.0 g. of potassium hydroxide, 385 cc. of ethanol and 150 cc. of water was added 34.4 g. of 2-diethylaminoethyl chloride hydrochloride and the resulting reaction mixture was refluxed for about 2 hours and then allowed to stand at room temperature overnight. The reaction solution was chilled in an ice bath; and, when no precipitate resulted, it was then evaporated to dryness by heating on a steam bath in vacuo. The residual material was taken up in ethanol and the resulting solution treated with decolorizing charcoal and filtered. To the filtrate was added 25 cc. of 20% ethanolic hydrogen chloride and the resulting solution was chilled in an ice bath. The precipitate that separated was collected and recrystallized from methanol and dried in a vacuum oven at 70° C. to yield 16.1 g. (47% yield) of the product, 1-(2-diethylaminoethyl)-7-methyl-4-oxo-1,8-naphthyridine-3-carboxylic acid in the form of its hydrochloride salt, M.P. 268.4–270° C. (corr.) with decomposition.

*Analysis.*—Calcd. for $C_{16}H_{21}N_3O_3 \cdot HCl$: Cl, 10.43; N, 12.37. Found: Cl, 10.51; N, 12.45.

Example 31

7 - methyl - 1 - (2 - methyl - 2 - propenyl)-4-oxo-1,8-naphthyridine-3-carboxylic acid was prepared as follows: A mixture containing 14.7 g. of 4-hydroxy-7-methyl-1,8-naphthyridine-3-carboxylic acid, 14.0 g. of potassium hydroxide, 280 cc. of ethanol, 110 cc. of water and 30 cc. of 3-chloro-2-methyl-1-propene was refluxed on a steam bath and then allowed to stand overnight at room temperature. The reaction mixture was acidified with concentrated hydrochloric acid and chilled in an ice bath. The crystalline precipitate that separated was collected, washed with water, dried in a vacuum oven (70° C.) and recrystallized from acetonitrile using decolorizing charcoal. After drying the recrystallized product in a vacuum over at 70° C., there was obtained 9.6 g. (52%) of 7 - methyl - 1 - (2-methyl-2-propenyl)-4-oxo-1,8-naphthyridine-3-carboxylic acid, M.P. 218.4–219.6° C. (corr.).

*Analysis.*—Calcd. for $C_{14}H_{14}N_2O_3$: C, 65.11; H, 5.46; N, 10.84. Found: C, 65.25; H, 5.43; N, 10.96.

7 - methyl - 1 - (2-methyl-2-propenyl)-4-oxo-1,8-naphthyridine-3-carboxylic acid when tested as described above was found to potentiate hexobarbital sleeping time in four out of six mice at a dose level of 200 mg. per kg.

Example 32

1 - (2 - butenyl)-7-methyl-4-oxo-1,8-naphthyridine-3-carboxylic acid was prepared following the procedure described in Example 1 using 10.2 g. of 4-hydroxy-7-methyl-1,8-naphthyridine-3-carboxylic acid, 16.3 g. of potassium hydroxide, 190 cc. of ethanol, 75 cc. of water, 25 cc. of 1-chloro-2-butene and a reflux period of 3 hours. There was thus obtained about 7 g. of the product, 1-(2-butenyl)-7-methyl-3-oxo-1,8-naphthyridine - 3 - carboxylic acid, M.P. 215.2–216.0° C. (corr.) when recrystallized twice from acetonitrile and dried in a vacuum oven (70° C.).

Analysis.—Calcd. for $C_{14}H_{14}N_2O_3$: C, 65.11; H, 5.46; N, 10.84. Found: C, 65.03; H, 5.50; N, 10.98.

1 - (2 - butenyl)-7-methyl-4-oxo-1,8-naphthyridine-3-carboxylic acid when tested as described above was found to potentiate hexobarbital sleeping time in three out of six mice at a dose level of 200 mg. per kg.

*Example 33*

1 - ethyl - 4 - oxo - 7 - styryl-1,8-naphthyridine-3-carboxylic acid was prepared as follows: A mixture containing 14.6 g. of 4-hydroxy-7-styryl-1,8-naphthyridine-3-carboxylic acid, 9.8 g. of potassium hydroxide, 230 cc. of ethanol, 80 cc. of water, and 20 cc. of ethyl iodide was refluxed on a steam bath for about 16 hours. The reaction mixture was then chilled in an ice bath and the solid that separated was collected, washed with acetone, dried in a vacuum oven (70° C.) and recrystallized from acetic acid to yield 12.8 g. of the product, 1 - ethyl - 4 - oxo-7-styryl-1,8-naphthyridine-3-carboxylic acid, a light yellow solid, M.P. 265.0–266.8° C. (corr.).

Analysis.—Calcd. for $C_{19}H_{16}N_2O_3$: N, 8.75; N.E., 320. Found: N, 8.89; N.E., 316.

The intermediate 4-hydroxy-7-styryl-1,8-naphthyridine-3-carboxylic acid was prepared in two steps as follows: A mixture containing 11.9 g. of ethyl 4-hydroxy-7-methyl-1,8-naphthyridine-3-carboxylate, 6.6 g. of benzaldehyde, 13.0 cc. of acetic acid and 22.0 cc. of acetic anhydride was refluxed for 9 hours and then allowed to stand at room temperature over the week end. The reaction mixture was then steamed distilled and the yellow residue that remained was collected and recrystallized from acetic acid to yield 4.6 g. of ethyl 4-hydroxy-7-styryl-1,8-naphthyridine - 3 - carboxylate, a lemon yellow solid, M.P. 286.0–288.6° C. (corr.) with decomposition.

Analysis.—Calcd. for $C_{19}H_{16}N_2O_3$: C, 71.24; H, 5.03; N, 8.75; N.E., 320. Found: C, 71.07; H, 5.71; N, 8.66; N.E., 310.

In the preceding preparation the steam distillation step can be omitted. In another run, after the heating of the reaction mixture, the solvent was removed by distillation and the remaining yellow solid was recrystallized from acetic acid using decolorizing charcoal.

The foregoing ester was converted into its corresponding carboxylic acid as follows: A mixture containing 30.6 g. of ethyl 4-hydroxy-7-styryl-1,8-naphthyridine-3-carboxylate and 283 cc. of 10% aqueous potassium hydroxide solution was refluxed for 3 and ½ hours after which time practically all of the solid had dissolved. The hot reaction mixture was filtered and allowed to cool. The cooled reaction mixture, which contained some yellow precipitate, was heated to boiling whereupon the solid dissolved; and the hot solution was acidified with concentrated hydrochloric acid. The resulting pale yellow precipitate was collected, washed with boiling water, and dried in a vacuum oven to yield 25.6 g. (91%) of the product, 4 - hydroxy-7-styryl-1,8-naphthyridine-3-carboxylic acid, M.P. 298–299° C. with decomposition.

1 - ethyl - 4 - oxo - 7 - styryl-1,8-naphthyridien-3-carboxylic acid when tested according to standard in vitro bacteriological evaluation procedures was found to possess antibacterial activity, for example, to have Bs and Bc values, respectively, of 5.6 and 4.6 against *Staphyloccoccus aureus* and of 5.6 and 4.3 against *Clostridium welchii*. This same compound when tested as described above for potentiation of hexobarbital sleeping time in mice was found to have an $ED_{50}$ of 39±13 mg. per kg.

*Example 34*

Ethyl 1-ethyl-4-oxo-7-styryl - 1,8 - naphthyridine-3-carboxylate was obtained together with the corresponding carboxylic acid in the following synthesis: A mixture containing 64 g. of ethyl 4-hydroxy-7-styryl-1,8-naphthyridine-3-carboxylate, 52 g. of potassium hydroxide, 920 cc. of ethanol, 320 cc. of water, and 80 cc. of ethyl iodide was refluxed for about 16 hours. The acidic reaction mixture was cooled in an ice bath; and the resulting precipitate was collected, washed twice with acetone and dried to yield 39.0 g. of solid (see below). The acetone washings were diluted with water and the yellow precipitate that separated was collected, washed with boiling water, recrystallized once from acetic acid-water and a second time from absolute ethanol to yield 6.1 g. of ethyl 1-ethyl-4-oxo-7-styryl-1,8-naphthyridine-3-carboxylate, M.P. 174.2–176.6° C. (corr.).

Analysis.—Calcd. for $C_{21}H_{20}N_2O_3$: C, 72.39; H, 5.79; N, 8.04. Found: C, 72.15; H, 5.49; N, 8.30.

The above 39 g. of solid was washed with hot 10% aqueous potassium carbonate solution and the resulting suspension was acidified with hydrochloric acid and filtered.

The filtered product was washed with water and dried in an oven (70° C.) to yield about 39 g. (62%) of 1-ethyl-4-oxo-7-styryl - 1,8 - naphthyridine - 3-carboxylic acid, the same product prepared above in Example 33.

Ethyl 1-ethyl-4-oxo-7-styryl - 1,8 - naphthyridine-3-carboxylate when tested according to standard in vitro bacteriological evaluation procedures was found to possess antibacterial activity, for example, to have Bs and Bc values, respectively, of 5.3 and 4.6 against *Staphylococcus aureus* and of 5.6 and 5.0 against *Clostridium welchii*. This same compound when tested as above for potentiation of hexobarbital sleeping time in mice was found to have an $ED_{50}$ of 2.28±0.7 mg. per kg.

*Example 35* n-Propyl 1-ethyl-4-oxo-7-styryl-1,8-naphthyridine-3-carboxylate was prepared as follows: A mixture containing 14.0 g. of ethyl 1-ethyl-7-styryl-4-oxo-1,8-naphthyridine-3-carboxylate, 200 cc. of n-propanol and 0.5 g. of sodium methoxide was refluxed on a steam bath over the week end in a flask equipped with a drying tube containing anhydrous calcium sulfate. The reaction mixture was cooled well in an ice bath and the resulting white precipitate was collected and recrystallized using decolorizing charcoal from ethanol-water to yield 7.4 g. (51%) of the product, a white solid, n-propyl 1-ethyl-4-oxo-7-styryl-1,8-naphthyridine - 3 - carboxylate, M.P. 181.8–183.0° C. (corr.).

Analysis.—Calcd. for $C_{22}H_{22}N_2O_3$: C, 72.91; H, 6.12; N, 7.73. Found: C, 73.14; H, 6.18; N, 7.73.

n-Propyl 1-ethyl-4-oxo - 7 - styryl - 1,8-naphthyridine-3-carboxylate when tested as above for potentiation of hexobarbital sleeping time in mice was found to have an $ED_{50}$ of about 8 mg. per kg.

*Example 36*

1-methyl-4-oxo-7-styryl - 1,8-naphthyridine-3-carboxylic acid was prepared following the procedure described in Example 33 using 38.0 g. of 4-hydroxy-7-styryl-1,8-naphthyridine-3-carboxylic acid, 25.4 g. of potassium hydroxide, 600 cc. of ethanol, 200 cc. of water, 50 cc. of methyl iodide and a reflux period of 1 and ½ hours. There was thus obtained 26.5 g. (67%) of the product, a cream-colored cottony solid, 1-methyl-4-oxo-7-styryl-1,8-naphthyridine-3-carboxylic acid, M.P. >300° C. (corr.), when recrystallized from acetic acid.

Analysis.—Calcd. for $C_{18}H_{14}N_2O_3$: C, 70.58; H, 4.61; N, 9.15. Found: C, 70.56; H, 4.25; N, 9.06.

*Example 37*

4-oxo-1-n-propyl - 7 - styryl - 1,8 - naphthyridine-3-carboxylic acid was prepared following the procedure described in Example 33 using 38.0 g. of 4-hydroxy-7-styryl-1,8-naphthyridine-3-carboxylic acid, 25.4 g. of potassium hydroxide, 600 cc. of ethanol, 210 cc. of water, 50 cc. of n-propyl bromide and a reflux period of 28 hours. After two recrystallizations from acetonitrile, there was obtained 25.1 g. of the product, a pale yellow solid, 4-oxo-1-n-propyl-7-styryl-1,8 - naphthyridine - 3 - carboxylic acid, M.P. 236.6–238.0° (corr.).

*Analysis.*—Calcd. for $C_{20}H_{18}N_2O_3$: C, 71.84; H, 5.42; N, 8.38. Found: C, 72.18; H, 5.19; N, 8.41.

Example 38

Ethyl 4-oxo-1-n-propyl-7 - styryl - 1,8 - naphthyridine-3-carboxylate was prepared as follows: 19.3 g. of 4-oxo-1-n-propyl-7-styryl-1,8-naphthyridine - 3 - carboxylic acid was dissolved in 500 cc. of chloroform and to this stirred solution was added 22.1 g. of oxalyl chloride. A yellow precipitate formed immediately. The reaction mixture was refluxed for 6 hours on a steam bath and then allowed to stand at room temperature over the week end in a flask sealed with a drying tube containing anhydrous calcium sulfate. To the reaction mixture was added 30 cc. of ethanol. The resulting solution was stirred, refluxed for 30 minutes, allowed to cool to room temperature, and filtered. The filtrate was washed once with 10% potassium carbonate and twice with water, dried over anhydrous potassium carbonate, and evaporated on a steam bath in vacuo. The dark residual oily material solidified on cooling. This solid was recrystallized twice from absolute ethanol, each time using decolorizing charcoal, and then dried in an oven (80° C.) to yield 13.1 g. of the product, ethyl 4-oxo-1-n-propyl - 7 - styryl - 1,8-naphthyridine-3-carboxylate, M.P. 134.8–136.8° C. (corr.).

*Analysis.*—Calcd. for $C_{22}H_{22}N_2O_3$: C, 72.91; H, 6.12; N, 7.73. Found: C, 72.99; H, 6.04; N, 7.67.

Ethyl 4-oxo-1-n-propyl - 7 - styryl - 1,8-naphthyridine-3-carboxylate when tested as above for potentiation of hexobarbital sleeping time in mice was found to have an $ED_{50}$ of about 2.05 mg. per kg.

Example 39

Ethyl 1-methyl-4-oxo - 7 - styryl - 1,8 - naphthyridine-3-carboxylate was prepared following the procedure described in Example 38 using 18.3 g. of 1-methyl-4-oxo-7-styryl-1,8-naphthyridine-3-carboxylic acid, 22.9 g. of oxalyl chloride, 500 cc. of chloroform and a reflux period of 5 hours. There was thus obtained 12.3 g. (61.5%) of the product, ethyl 1-methyl-4-oxo - 7 - styryl-1,8-naphthyridine - 3 - carboxylate, M.P. 200.5–201.4° C. (corr.), after 2 recrystallizations from acetonitrile using decolorizing charcoal.

*Analysis.*—Calcd. for $C_{20}H_{18}N_2O_3$: C, 71.84; H, 5.42; N, 8.38. Found: C, 72.02; H, 5.42; N, 8.40.

Ethyl 1-methyl-4-oxo - 7 - styryl - 1,8 - naphthyridine-3-carboxylate when tested as above for potentiation of hexobarbital sleeping time in mice was found to have an $ED_{50}$ of 41±12 mg. per kg.

Example 40

Methyl 1-ethyl-4-oxo-7-styryl - 1,8-naphthyridine-3-carboxylate was prepared following the procedure described in Example 38 using 15.0 g. of 1-ethyl-4-oxo-7-styryl-1,8-naphthyridine-3-carboxylic acid, 17.9 g. of oxalyl chloride, 400 cc. of chloroform and a reflux period of 1 hour. Dry methanol (30 cc.) was added slowly to the reaction mixture instead of the ethanol used in Example 38. After two recrystallizations of the crude product from acetonitrile using decolorizing charcoal, there was obtained 7.1 g. of the product, methyl 1-ethyl-4-oxo-7-styryl-1,8-naphthyridine-3-carboxylate, M.P. 211.6–214.2° C. (corr.).

*Analysis.*—Calcd. for $C_{20}H_{18}N_2O_3$: C, 71.84; H, 5.42; N, 8.38. Found: C, 71.97; H, 5.55; N, 8.43.

Methyl 1-ethyl-4-oxo-7-styryl - 1,8-naphthyridine-3-carboxylate when tested as above for potentiation of hexobarbital sleeping time in mice was found to have an $ED_{50}$ of about 100 mg. per kg.

Example 41

Isopropyl 1 - ethyl-4-oxo-7-styryl-1,8-naphthyridine-3-carboxylate was prepared following the procedure described in Example 38 using 13.8 g. of 1-ethyl-4-oxo-7-styryl-1,8-naphthyridine-3-carboxylic acid, 16.4 g. of oxalyl chloride, 400 cc. of chloroform, a reflux period of 1 hour, and 30 cc. of dry isopropyl alcohol added dropwise. There was thus obtained 11.3 g. (73%) of the product, isopropyl 1-ethyl-4-oxo-7-styrl-1,8-naphthyridine-3-carboxylate, M.P. 183.2–184.0° C. (corr.) when recrystallized from ethanol using decolorizing charcoal.

*Analysis*—Calcd. for $C_{22}H_{22}N_2O_3$: C, 72.91; H, 6.12; N, 7.73. Found: C, 72.76; H, 6.29; N, 7.73.

Isopropyl 1 - ethyl-4-oxo-7-styryl-1,8-naphthyridine-3-carboxylate when tested above for potentiation of hexobarbital sleeping time in mice was found to have an $ED_{50}$ of 2.7±0.2 mg. per kg.

Example 42

1-ethyl - 7-(4-methoxystyryl)-4-oxo-1,8-naphthyridine-3-carboxylic acid was prepared following the procedure described in Example 33 using 51.2 g. of 4-hydroxy-7-(4 - methoxystyryl)1,8-naphthyridine-3-carboxylic acid, 31.0 g. of potassium hydroxide, 730 cc. of methanol, 255 cc. of water, 60 cc. of ethyl iodide and a reflux period of 16 hours. There was thus obtained 28.4 g. (51%) of the product, 1 - ethyl - 7-(4-methoxystyryl)-4-oxo-1,8-naphthyridine-3-carboxylic acid, M.P. 282.6–286.7° C. (corr.), after one recrystallization from acetic acid.

*Analysis.*—Calcd. for $C_{20}H_{18}N_2O_4$: C, 68.56; H, 5.18; N, 7.99. Found: C, 68.84; H, 4.98; N, 7.97.

The intermediate 4 - hydroxy-7-(4-methoxystyryl)-1,8-naphthyridine-3-carboxylic acid was prepared in two steps following the procedure described in Example 33 using 10.0 g. of ethyl 4-hydroxy-7-methyl-1,8-naphthyridine-3-carboxylate, 7.1 g. of 4-methoxybenzaldehyde, 11.5 cc. of acetic acid, 19.2 cc. of acetic anhydride and a reflux period of about 64 hours. There was first obtained 5.6 g. of ethyl 4-hydroxy-7-(4-methoxystyryl)-1,8-naphthyridine-3-carboxylate, M.P. >300° C. (corr.), after one recrystallization from acetic acid using decolorizing charcoal.

*Analysis.*—Calcd. for $C_{20}H_{18}N_2O_4$: C, 68.56; H, 5.18; N, 7.99. Found: C, 68.40; H, 5.10; N, 7.91.

The above ester was then hydrolyzed to its corresponding carboxylic acid following the procedure described in Example 33 for the corresponding 7-styryl compound using 91.6 g. of ethyl 4-hydroxy-7-(4-methoxystyryl)-1,8-naphthyridine-3-carboxylate, 850 cc. of 10% aqueous potassium hydroxide solution and a reflux period of 3 hours. There was thus obtained 56.4 g. of 4-hydroxy-7-(4-methoxystyryl) - 1,8-naphthydridine-3-carboxylic acid, M.P. 292.6–294.4° C. (corr.) when recrystallized from diethylene glycol monoethyl ether using decolorizing charcoal.

*Analysis.*—Calcd. for $C_{18}H_{14}N_2O_4$: C, 67.07; H, 4.38; N, 8.69. Found: C, 67.41; H, 4.49; N, 8.63.

Example 43

Ethyl 1-ethyl-7-(4-methoxystyryl)-4-oxo-1,8-naphthyridine-3-carboxylate was prepared following the procedure described in Example 38 using 18.0 g. of 1-ethyl-7-(4-methoxystyryl) - 4 - oxo-1,8-naphthyridine-3-carboxylic acid, 19.6 g. of oxalyl chloride, 500 cc. of chloroform, a reflux of 1 hour and 30 cc. of absolute ethanol added dropwise. There was thus obtained 11.8 g. of the product, ethyl 1 - ethyl-7-(4-methoxystyryl)-4-oxo-1,8-naphthyridine-3-carboxylate, M.P. 184.2–186.8° C. (corr.) after 3 recrystallizations from acetonitrile using decolorizing charcoal.

*Analysis.*—Calcd. for $C_{22}H_{22}N_2O_4$: C, 69.83; H, 5.86; N, 7.40. Found: C, 69.98; H, 5.69; N, 7.45.

Example 44

1 - ethyl-4-oxo-7-(2-phenylethyl)-1,8-naphthyridine-3-carboxylic acid was prepared by catalytic hydrogenation of the corresponding 7-styryl compound as follows: A mixture containing 10.0 g. of 1-ethyl-4-oxo-7-styryl-1,8-naphthyridine-3-carboxylic acid, platinum oxide, 400 cc. of acetic acid were placed in a steel bomb and heated at a temperature of about 114–119° C. at a pressure of about 125 lbs. of hydrogen. The reaction took about 30 minutes and 1.76 mole equivalents of hydrogen were taken up. The contents of the bomb were emptied into a large beaker and rinsed with fresh acetic acid. The reaction mixture was then filtered through diatomaceous earth to remove the platinum catalyst. The clear yellow filtrate was evaporated to dryness on a steam bath under reduced pressure to yield a yellow solid. The solid was recrystallized using decolorizing charcoal from 500 cc. of absolute ethanol and then recrystallized a second time from ethyl acetate to yield 3.7 g. of the product, 1-ethyl-4-oxo-7-(2-phenyl-ethyl)-1,8-naphthyridine-3-carboxylic acid M.P. 178.0–179.2° C. (corr.).

Analysis.—Calcd. for $C_{19}H_{18}N_2O_3$: N, 8.69; N.E., 322. Found: N, 8.73; N.E., 322.

1 - ethyl-4-oxo-7-(2-phenylethyl)-1,8-naphthyridine-3-carboxylic acid when tested according to standard in vitro bacteriological evaluation procedures was found to possess antibacterial activity, for example, to have Bs and Bc values, respectively, of 5.0 and 4.6 against *Staphylococcus aureus* and of 5.0 and 4.6 against *Clostridium welchii*. This same compound when tested as described above for potentiation of hexobarbital sleeping time in mice was found to have an $ED_{50}$ of 48±13.7 mg. per kg.

*Example 45*

1 - ethyl-4-oxo-1,8-naphthyridine-3,7-dicarboxylic acid was prepared as follows: To a stirred suspension containing 28.0 g. of 1-ethyl-4-oxo-7-styryl-1,8-naphthyridine-3-carboxylic acid in 192 cc. of pyridine and 35 cc. of water cooled to 15–20° C. in an ice bath was added portionwise over a period of about 1 hour 36.8 g. of potassium permanganate. The temperature was kept at 15–20° C. during the addition of the permanganate. After two 90 cc. portions of water were added to the reaction mixture, one after half of the permanganate had been added and the other after completion of the addition of the permanganate, the reaction mixture was stirred for an additional 30 minutes. After an unsuccessful attempt to remove the colloidal manganese dioxide by filtration, sodium bisulfite solution was added until all manganese dioxide had been destroyed. The mixture was then acidified with 6 N sulfuric acid whereupon pale yellow solid separated. The solid was collected and dissolved in 10% aqueous potassium carbonate solution. This solution was filtered and to the filtrate was added hydrochloric acid to reprecipitate the product. The solid was collected, washed with water and recrystallized from acetic acid using decolorizing charcoal. It was then washed with acetone and dried in a vacuum oven at 70° C. to yield 5 g. (77%) of the product, 1-ethyl-4-oxo-1,8-naphthyridine-3,7-dicarboxylic acid, M.P. 282–283.4° C. (corr.) with decomposition.

Analysis.—Calcd. for $C_{12}H_{10}N_2O_5$: N, 10.68; N.E., 131 and 262. Found: N, 10.76; N.E., 129 and 273.

*Example 46*

1-ethyl-4-oxo-1,8-naphthyridine-3-carboxylic acid was prepared as follows: A mixture containing 5.8 g. of 1-ethyl-4-oxo-1,8-naphthyridine-3,7-dicarboxylic acid and 0.29 g. of 2-pyridone suspended in 58 cc. of Dowtherm A was refluxed for about 20 minutes. The supernatant liquid was decanted into a clean flask and allowed to cool to room temperature. The solid that separated was collected, washed three times with ether, and recrystallized three times from acetonitrile, the first time using decolorizing charcoal, to yield 1.1 g. of the product, 1-ethyl-4-oxo-1,8-naphthyridine-3-carboxylic acid, M.P. 231.0–231.8° C. (corr.).

Analysis.—Calcd. for $C_{11}H_{10}N_2O_3$: C, 60.54; H, 4.62; N, 12.84. Found: C, 60.36; H, 4.33; N, 12.95.

*Example 47*

7-amino-1-ethyl-4-oxo-1,8-naphthyridine-3 - carboxylic acid was prepared as follows: 14 g. of ethyl 7-acetamido-1-ethyl-4-oxo-1,8-naphthyridine-3-carboxylate was dissolved by boiling with a mixture of 50 cc. of 6 N hydrochloric acid and 50 cc. of water. About 10 minutes after dissolution, solid separated and to this mixture was added 100 cc. of water plus 150 cc. of 6 N hydrochloric acid. The mixture was heated near boiling for about 30 minutes to dissolve most of the solid and the resulting mixture was filtered. The filtrate was poured into a slight excess of potassium hydroxide solution and ice. When no solid separated, hydrochloric acid was added till acidic and the resulting solid was collected, recrystallized from 6 N hydrochloric acid, dried in a vacuum oven at 60° C. to yield 8.4 g. of the product, a white solid, 7-amino-1-ethyl-4-oxo-1,8-naphthyridine-3-carboxylic acid, M.P. >300° C. (corr.).

Analysis.—Calcd. for $C_{11}H_{11}N_3O_3$: N, 18.02; N.E., 233. Found: N, 17.97; N.E., 231.

Ethyl 7-acetamido-1-ethyl-4-oxo-1,8-naphthyridine-3-carboxylate was prepared in several steps starting with 2,6-diaminopyridine as follows: To a solution containing 327 g. of 2,6-diaminopyridine in 1500 cc. of ethanol kept at about 40–45° C. was added 627 g. of diethyl ethoxymethylenemalonate and the resulting reaction solution was kept at 45–55° C. for about 25 minutes and then refluxed on a steam bath for 10 minutes. The reaction solution was then cooled and the solid that separated was collected, washed well with cold ethanol, recrystallized from benzene and dried in a vacuum oven at 60° C. to obtain about 450 g. of diethyl N-(6-amino-2-pyridyl) aminomethylenemalonate, M.P. 114–116° C.

Analysis.—Calcd. for $C_{13}H_{17}N_3O_4$: N, 15.05. Found: N, 15.08, 15.07.

A mixture containing 14 g. of diethyl N-(6-amino-2-pyridyl)-aminomethylenemalonate, 10 cc. of acetic anhydride and 100 cc. of Dowtherm A was heated first at 140° C. for about 15 minutes, then from 140° C. to about 250° C. over a period of 30 minutes and finally at 250° C. for about 15 minutes. The reaction mixture was cooled to 100° C. and the solid that separated was collected, washed with benzene and n-pentane, recrystallized from dimethylformamide, washed well with ethanol and dried in a vacuum oven at 60° C. There was thus obtained 7.2 g. of ethyl 7-acetamido-4-hydroxy-1,8-naphthyridine-3-carboxylate, M.P. >300° C. (corr.).

Analysis.—Calcd. for $C_{13}H_{13}N_3O_4$: C, 56.73; H, 4.76; N, 15.27. Found: C, 56.69; H, 4.59; N, 15.42.

Ethyl 7 - acetamido-1-ethyl-4-oxo-1,8-naphthyridine-3-carboxylate was prepared as follows: A mixture containing 27.5 g. of ethyl 7-acetamido-4-hydroxy-1,8-naphthyridine-3-carboxylate, 58 cc. of 10% aqueous potassium hydroxide solution, 350 cc. of water, 500 cc. of ethanol and 30 cc. of ethyl iodine was refluxed for 1 and ½ hours. The neutral reaction mixture was concentrated by heating on a steam bath to remove the ethanol. To the resulting thick white slurry was added about 500 cc. of water; and the solid was collected and recrystallized twice from ethanol to yield 18.5 g. of the product, ethyl 7-acetamido-1-ethyl-4-oxo-1,8-naphthyridine-3-carboxylate, M.P. 192–195° C. This material was used in the above preparation without further purification.

7-amino-1-ethyl-4-oxo-1,8-naphthyridine-3 - carboxylic acid when tested according to standard in vitro bacteriological evaluation procedures was found to possess antibacterial activity, for example, to have Bs and Bc values, respectively, of 3.6 and <3.0 against *Staphylococcus aureus*, of 4.0 and 3.0 against *Eberthella typhi* and of 4.3 and 3.0 against *Clostridium welchii*.

*Example 48*

7-amino-1-methyl-4-oxo-1,8-naphthyridine-3-carboxylic acid was prepared as follows: A mixture containing 27.5 g. of ethyl 7-acetamido-4-hydroxy-1,8-naphthyridine-3-carboxylate, 58 cc. of 10% aqueous potassium hydroxide, 500 cc. of ethanol, 350 cc. of water and 10 cc. of methyl iodide was refluxed on a steam bath for 3 hours, with occasional small additions of methyl iodide (to replace that lost by volatilization and hydrolysis). An additional 140 cc. of 10% aqueous potassium hydroxide was added to the reaction mixture and heating was continued on a steam bath without a condenser for an additional 3 hours. The thus partially concentrated reaction mixture was filtered and the filtrate poured with stirring into 50 cc. of 6 N hydrochloric acid, adding water as needed to facilitate stirring. The resulting white precipitate was collected, washed with water, recrystallized from 6 N hydrochloric acid and dried in a vacuum oven at 70° C. to yield 16.9 g. of the product, 7-amino-1-methyl-4-oxo-1,8-naphthyridine-3-carboxylic acid, M.P. >300° C. (corr.).

Analysis.—Calcd. for $C_{10}H_9N_3O_3$: C, 54.79; H, 4.14; N, 19.17. Found: C, 54.72; H, 4.65; N, 19.06.

7-amino-1-methyl-4-oxo-1,8-naphthyridine-3-carboxylic acid when tested according to the procedure described above was found to potentiate hexobarbital sleeping time in four out of six mice at a dose level of 200 mg. per kg.

Example 49

7-amino-1-n-propyl-4-oxo-1,8-naphthyridine-3-carboxylic acid was prepared as follows: A mixture containing 27.5 g. of ethyl 7-acetamido-4-hydroxy-1,8-naphthyridine-3-carboxylate, 58 cc. of 10% aqueous potassium hydroxide, 350 cc. of water, 25 cc. of ethanol and 25 cc. of n-propyl iodide was refluxed on a steam bath for a period of 5 hours. An additional 260 cc. of 10% aqueous potassium hydroxide solution was added to the acidic reaction mixture and refluxing was continued for an additional 5 hours, again adding about 25 cc. of n-propyl iodide. The reaction mixture was then refluxed for 1 hour without a condenser to allow removal of the excess n-propyl iodide and ethanol, filtered, and the filtrate treated with excess dilute aqueous hydrochloric acid. The solid that separated was collected, recrystallized once from ethanol and a second time from n-propanol, and dried in a vacuum oven at 60° C. to yield 10.5 g. of pale yellow solid, 7-amino-1-n-propyl-4-oxo-1,8-naphthyridine-3-carboxylic acid, M.P. 225.4–227.6° C. (corr.).

Analysis.—Calcd. for $C_{12}H_{13}N_3O_3$: C, 58.29; H, 5.30; N, 17.00. Found: C, 58.36; H, 5.27; N, 16.76.

7-amino-1-n-propyl-4-oxo-1,8-naphthyridine-3-carboxylic acid when tested according to standard in vitro bacteriological evaluation procedures was found to possess antibacterial activity, for example, to have Bs and Bc values, respectively, of 3.61 and <3.01 against *Staphylococcus aureus* and of 4.31 and 3.31 against *Clostridium welchii*.

Example 50

7-acetamido-1-ethyl-4-oxo-1,8-naphthyridine-3-carboxylic acid was prepared as follows: A mixture containing 18.7 g. of 7-amino-1-ethyl-4-oxo-1,8-naphthyridine-3-carboxylic acid, 200 cc. of acetic anhydride and 200 cc. of acetic acid was refluxed with stirring for 5 hours. To the reaction mixture was then added 4 drops of concentrated sulfuric acid and refluxing was continued overnight (for about 16 hours). The reaction mixture was filtered while hot and the filtrate was chilled in an ice bath. The precipitate that separated was collected, triturated with ethyl acetate and dried in a vacuum oven at 60° C. to yield 11.0 g. of the white product, 7-acetamido-1-ethyl-4-oxo-1,8-naphthyridine-3-carboxylic acid, M.P. >300° C. (corr.).

Analysis.—Calcd. for $C_{13}H_{13}N_3O_4$: C, 56.72; H, 4.76; N, 15.27. Found: C, 56.68; H, 4.17; N, 15.31.

7-acetamido-1-ethyl-4-oxo-1,8-naphthyridine-3-carboxylic acid when tested according to standard in vitro bacteriological evaluation procedures was found to possess antibacterial activity, for example, to have Bs and Bc values, respectively, of 4.3 and 3.12 against *Eberthella typhi* and of 4.3 and 3.6 against *Clostridium welchii*. This same compound was found to have significant in vivo activity against *Klebsiella pneumoniae* in mice when administered orally at a dose level of 400 mg. per kg. per day or when administered subcutaneously at a dose level of 200 mg. per kg. per day.

Example 51

1-ethyl-4-oxo-7-propionamido-1,8-naphthyridine-3-carboxylic acid was prepared as follows: A mixture containing 12.8 g. of 7-amino-1-ethyl-4-oxo-1,8-naphthyridine-3-carboxylic acid, 200 cc. of propionic anhydride and 6 drops of sulfuric acid was refluxed for 6 hours, allowed to cool to room temperature and then slowly poured with stirring into 1 liter of methanol. The solid that separated was collected, recrystallized once from dimethylformamide using decolorizing charcoal and once from acetonitrile using decolorizing charcoal, and then dried in a vacuum oven at 70° C. to yield 4.0 g. of the product, 1-ethyl-4-oxo-7-propionamido-1,8-naphthyridine-3-carboxylic acid, M.P. 236.4–237.2° C. (corr.).

Analysis.—Calcd. for $C_{14}H_{15}N_3O_4$: C, 58.10; H, 5.23; N, 14.52. Found: C, 58.44; H, 5.29; N, 14.44.

1-ethyl-4-oxo-7-propionamido-1,8-naphthyridine-3-carboxylic acid when tested according to the procedure described above for potentiation of hexobarbital sleeping time in mice was found to have an $ED_{50}$ of $230 \pm 69.8$ mg. per kg.

Example 52

1-ethyl-7-formamido-4-oxo-1,8-naphthyridine-3-carboxylic acid was prepared as follows: A mixture containing 23.3 g. of 7-amino-1-ethyl-4-oxo-1,8-naphthyridine-3-carboxylic acid, 75 cc. of formic acid and 75 cc. of acetic anhydride was refluxed for 2 hours and then allowed to stand at room temperature overnight (about 16 hours). The liquid was decanted from the separated solid; and the solid was stirred with 300 cc. of water for about ½ hour, filtered and washed with water. The solid was then recrystallized from pyridine acetate using decolorizing charcoal, washed successively with water and acetone, and then dried for 5 hours in a vacuum oven at 70° C. to yield a white product, 1-ethyl-7-formamido-4-oxo-1,8-naphthyridine-3-carboxylic acid, M.P. 293.8–294.6° C. (corr.) with decomposition.

Analysis.—Calcd. for $C_{12}H_{11}N_3O_4$: C, 55.16; H, 4.24; N, 16.08. Found: C, 55.22; H, 4.11; N, 16.18.

Example 53

7-bromo-1-ethyl-4-oxo-1,8-naphthyridine-3-carboxylic acid was prepared as follows: 18.6 g. of 7-amino-1-ethyl-4-oxo-1,8-naphthyridine-3-carboxylic acid was partially dissolved in 192 cc. of 48% hydrobromic acid and the mixture was cooled to 0° C. To the stirred mixture kept at 0° C. was added dropwise first over a period of fifteen minutes 12 cc. of bromine and then over a period of 20 minutes a solution of 18.8 g. of sodium nitrite in 25 cc. of water. After the resulting mixture was stirred an additional 30 minutes, it was made alkaline with a solution containing 100 g. of sodium hydroxide in 500 cc. of water, keeping the temperature below 27° C. There resulted a large gummy orange lump. This was separated by decanting the liquid and then triturated (in a mortar) in a dilute solution of aqueous sodium hydroxide and ethanol. The mixture was allowed to stand overnight whereupon it partially solidified. The solid was removed by filtration and the filtrate was acidified with hydrochloric acid. The solid that separated was collected, triturated with ethanol and then recrystallized from dimethyl formamide twice to yield 2.5 g. (10%) of the white solid product, 7-bromo-1-ethyl-4-oxo-1,8-naphthyridine-3-carboxylic acid, M.P. 255.0–256.0° C. (corr.).

Analysis.—Calcd. for $C_{11}H_9BrN_2O_3$: Br, 26.92; N, 9.43. Found: Br, 26.91; N, 9.28.

7-bromo-1-ethyl-4-oxo-1,8-naphthyridine-3-carboxylic acid was found to have significant in vivo activity against *Klebsiella pneumoniae* in mice when administered subcutaneously at a dose level of 100 mg. per kg. per day.

Example 54

1-ethyl - 7 - hydroxy-4-oxo-1,8-naphthyridine-3-carboxylic acid was prepared as follows: To a partial solution of 7.0 g. of 7-amino-1-ethyl-4-oxo-1,8-naphthyridine-3-carboxylic acid in 35 cc. of concentrated sulfuric acid and 40 cc. of water kept at 0° C. was added portionwise 3 g. of sodium nitrite; and the resulting mixture was stirred for 1 hour at 0° C. To the raction mixture was added about 300 cc. of boiling water whereupon a white solid separated. The mixture was heated to boiling and then cooled in an ice bath. The solid was collected, washed with water, recrystallized once from ethanol, once from dimethylformamide, and then washed with ethanol to yield the product, 1-ethyl-7-hydroxy-4-oxo-1,8-naphthyridine-3-carboxylic acid, M.P. 287.8–288.6° C. (corr.), when dried at 60° C.

*Analysis.*—Calcd. for $C_{11}H_{10}N_2O_4$: C, 56.41; H, 4.30; N, 11.95. Found: C, 56.46; H, 4.19; N, 12.18.

1-ethyl - 7 - hydroxy-4-oxo-1,8-naphthyridine-3-carboxylic acid when tested according to standard in vitro bacteriological evaluation procedures was found to possess antibacterial activity, for example, to have Bs and Bc values, respectively, of 4.3 and 3.82 against *Staphylococcus aureus*, of 3.7 and <3.7 against *Eberthella typhi* and of 4.3 and 3.7 against *Clostridium welchii*.

Example 55

7-chloro-1-ethyl-4-oxo - 1,8-naphthyridine-3-carboxylic acid was prepared as follows: A mixture containing 56 g. of 1-ethyl-7-hydroxy-4-oxo-1,8-naphthyridine-3-carboxylic acid and 200 cc. of phosphorus oxychloride was refluxed for 30 minutes and then concentrated to remove about 125 cc. of the excess $POCl_3$. The concentrate was then poured into a mixture of water and ice; and the solid that separated was collected to yield 50 g. of the product, 7-chloro-1-ethyl-4-oxo-1,8-naphthyridine-3-carboxylic acid, M.P. 252–255° C. with decomposition. For analysis, a 12 gram portion of the product was recrystallized from acetonitrile using decolorizing charcoal to yield 9.3 g. of white solid product which melted at 249.8–250.4° C. (corr.) and analysed as follows.

*Analysis.*—Calcd. for $C_{11}H_9ClN_2O_3$: Cl, 14.05; N, 11.09. Found: Cl, 13.83; N, 11.24.

7-chloro-1-ethyl - 4-oxo-1,8-naphthyridine-3-carboxylic acid when tested according to standard in vitro bacteriological evaluation procedures was found to possess antibacterial activity, for example, to have Bs and Bc values, respectively, of 4.6 and <3.0 against *Staphylococcus aureus*, of 5.3 and 3.6 against *Eberthella typhi* and of 4.6 and 3.0 against *Clostridium welchii*.

Example 56

7-ethoxy - 1-ethyl-4-oxo-1,8-naphthyridine-3-carboxylic acid was prepared as follows: A 5.0 g. portion of 7-chloro-1-ethyl-4-oxo-1,8-naphthyridine-3-carboxylic acid was dissolved in 60 cc. of dry dimethylformamide at reflux. Heating was discontinued and to the solution was added over a 2 minute period 60 cc. of a 0.06 M solution of sodium ethoxide in dry ethanol. The reaction mixture was allowed to stand about 10 minutes and then poured into water. The aqueous mixture was made acidic with hydrochloric acid; and the solid that separated was collected, recrystallized once from ethanol and once from dimethylformamide to yield the product, 7-ethoxy-1-ethyl-4-oxo-1,8-naphthyridine-3-carboxylic acid, M.P. 226.8–227.8° C. (corr.).

*Analysis.*—Calcd. for $C_{13}H_{14}N_2O_4$: C, 59.53; H, 5.38; N, 10.68. Found: C, 59.72; H, 5.25; N, 10.91.

7-ethoxy - 1-ethyl-4-oxo-1,8-naphthyridine-3-carboxylic acid when tested as described above was found to potentiate hexobarbital sleeping time in four out of six mice at a dose level of 200 mg. per kg.

7-ethoxy - 1-ethyl-4-oxo-1,8-naphthyridine-3-carboxylic acid also can be obtained following the procedure described in Example 1 using molar equivalent quantities of 7-ethoxy-4-hydroxy-1,8-naphthyridine-3 - carboxylic acid, potassium hydroxide, ethanol, water and ethyl iodide. The corresponding ethyl ester is obtained following the procedure described in Example 16 using ethyl 7-ethoxy-4-hydroxy-1,8-naphthyridine-3-carboxylate, sodium ethoxide, absolute ethanol and ethyl iodide.

Example 57

7-(2-diethylaminoethoxy)-1-ethyl-4-oxo - 1,8-naphthyridine-3-carboxylic acid was prepared as follows: To a solution of 13.8 g. of 2-diethylaminoethyl chloride hydrochloride in 75 cc. of dry ethanol was added 200 cc. of one molar solution of sodium ethoxide in ethanol. This mixture was combined with a solution of 14 g. of 1-ethyl-7-hydroxy-4-oxo-1,8-naphthyridine-3-carboxylic acid in 100 cc. of dry dimethylformamide. The resulting slurry was refluxed on a steam bath for 3 and ½ hours. Fifty cc. of water was added to the solid-liquid reaction mixture and it was concentrated to a syrupy solid which was dissolved in 100 cc. of water. The aqueous solution was treated with decolorizing charcoal and filtered. The filtrate was neutralized with acetic acid, chilled, and filtered. The filtrate was concentrated to a tan tarry solid which was extracted with hot acetone. Addition of 18% ethanolic hydrogen chloride to the hot acetone extract and cooling yielded 20 g. of cream solid which was collected and dried. The solid was dissolved in 100 cc. of water and 35 cc. of 10% potassium bicarbonate was added (pH=6.4). The solution was extracted several times with chloroform, adjusting the pH from about 6 to 7.5 between extractions. The combined extracts were dried over anhydrous sodium sulfate and concentrated to yield 11.4 g. of cream colored solid which was recrystallized twice from ethyl acetate to yield 6.8 g. (34%) of pale cream colored solid product, 7-(2-diethylaminoethoxy)-1-ethyl - 4 - oxo-1,8-naphthyridine-3-carboxylic acid, M.P. 163.6–165.4° C. (corr.).

*Analysis.*—Calcd. for $C_{17}H_{23}N_3O_4$: C, 61.24; H, 6.95; N, 12.61. Found: C, 61.30; H, 6.74; N, 12.49.

Example 58

1-ethyl - 7 - ethylmercapto-4-oxo-1,8-naphthyridine-3-carboxylic acid was prepared as follows: 12.0 g. of 7-chloro-1-ethyl-4-oxo-1,8-naphthyridine-3-carboxylic acid was dissolved in 200 cc. of dry dimethylformamide by boiling. To this hot solution was added a mixture containing 18 g. of ethylmercaptan, 67 cc. of 10% aqueous potassium hydroxide solution and 100 cc. of ethanol. The resulting reaction mixture was allowed to stand for 5 minutes and then poured into about 1 liter of water containing excess hydrochloric acid. The precipitate that separated was collected, washed successively with water and a little ethanol, and then recrystallized from dimethylformamide. The recrystallized solid was triturated in hot ethanol, collected, and dried to yield 10.2 g. of the product, 1-ethyl-7-ethylmercapto - 4-oxo-1,8-naphthyridine-3-carboxylic acid, M.P. 217.2–218.4° C. (corr.).

*Analysis.*—Calcd. for $C_{13}H_{14}N_2O_3S$: N, 10.17; S, 11.51. Found: N, 10.32; S, 11.46.

1-ethyl - 7 - ethylmercapto-4-oxo-1,8-naphthyridine-3-carboxylic acid when tested as described above was found to potentiate hexobarbital sleeping time in four out of six mice at a dose level of 200 mg. per kg.

Example 59

7 - dimethylamino - 1 - ethyl - 4 - oxo - 1,8 - naphthyridine-3-carboxylic acid was prepared as follows: A mixture containing 12.6 g. of 7-chloro-1-ethyl-4-oxo-1,8-naphthyridine-3-carboxylic acid and 50 cc. of 25% aqueous dimethylamine was heated on a steam bath for about 25 minutes. The resulting turbid solution was diluted with water and then poured into an excess of very dilute hydrochloric acid solution. The solid that separated was collected, triturated first with water and then with ethanol, and recrystallized from dimethylformamide. The recrystallized solid was triturated with boiling ethanol, collected and dried to yield 11.0 g. of the white product, 7 - dimethylamino - 1 - ethyl - 4 - oxo - 1,8 - naphthyridine-3-carboxylic acid, M.P. 271.4–272.2° C. (corr.).

Analysis.—Calcd. for $C_{13}H_{15}N_3O_3$: C, 59.76; H, 5.79; N, 16.08. Found: C, 59.89; H, 5.50; N, 16.08.

*Example 60*

7 - (5 - diethylamino - 2 - pentylamino) - 1 - ethyl - 4-oxo-1,8-naphthyridine-3-carboxylic acid was prepared as follows: A mixture containing 12.6 g. of 7-chloro-1-ethyl-4-oxo-1,8-naphthyridine-3-carboxylic acid, 15.9 g. of 5-diethylamino-2-pentylamine and 200 cc. of acetonitrile was refluxed for 4 hours, and the solvent was then removed by distilling in vacuo to yield a viscous, clear, oily material. The oily material was taken up in chloroform and extracted with aqueous potassium hydroxide solution. The alkaline solution was washed three times with chloroform, acidified with a slight excess of concentrated hydrochloric acid, washed with chloroform, neutralized with 10% aqueous potassium bicarbonate solution, and allowed to cool with stirring whereupon a solid slowly formed. The solid was collected and heated with isopropyl alcohol containing 20 cc. of 15% ethanolic hydrogen chloride. The hot solution was filtered, allowed to stand at room temperature, and the precipitate that formed was collected, washed with acetone, recrystallized from ethanol and air-dried to yield 5 g. of the product, 7-(5-diethylamino - 2 - pentylamino) - 1 - ethyl - 4 - oxo - 1,8 - naphthyridine-3-carboxylic acid in the form of its hydrochloride, M.P. 242.0–243.2° C. (corr.).

Analysis.—Calcd. for $C_{20}H_{30}N_4O_3 \cdot HCl$: C, 58.46; H, 7.60; N, 13.62. Found: C, 58.46; H, 7.42; N, 13.58.

*Example 61*

1 - ethyl - 7 - hydrazino - 4 - oxo - 1,8 - naphthyridine-3-carboxylic acid was prepared as follows: 12.6 g. of 7-chloro-1-ethyl-4-oxo-1,8-naphthyridine-3-carboxylic acid and 50 g. of hydrazine hydrate were mixed at room temperature and then warmed on a steam bath for about 1 hour. The reaction mixture was then allowed to cool and the solid that separated was collected and dissolved in about 200 cc. of water by warming on a steam bath. The hot solution was filtered and poured into 200 cc. of concentrated hydrochloric acid. The resulting mixture was stirred at room temperature and then cooled. The solid that separated was collected, washed well with water and then dissolved in aqueous potassium hydroxide solution. The alkaline solution was treated with decolorizing charcoal, filtered, and to the filtrate was added a slight excess of 6 N hydrochloric acid. The solid that separated was collected, washed with acetone and recrystallized from 6 N hydrochloric acid using decolorizing charcoal to yield 6.5 g. of the yellow product, 1-ethyl-7-hydrazino-4-oxo-1,8-naphthyridine-3-carboxylic acid in the form of its hydrochloride, M.P. >300° C. (corr.).

Analysis.—Calcd. for $C_{11}H_{12}N_4O_3 \cdot HCl$: Cl, 12.44; N, 19.68. Found: Cl, 12.40; N, 19.67.

*Example 62*

1 - (3 - hydroxypropyl) - 7 - methyl - 4 - oxo - 1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 3-hydroxypropyl iodide. The corresponding ethyl ester is obtained following the procedure described in Example 16 using ethyl 4-hydroxy-7-methyl-1,8-naphthyridine-3-carboxylate, sodium ethoxide, absolute ethanol and 3-hydroxypropyl iodide.

*Example 63*

Ethyl 1 - (3 - chloropropyl) - 7 - methyl - 4 - oxo - 1,8-naphthyridine-3-carboxylate is obtained by reacting the corresponding 1-(3-hydroxypropyl) compound of the preceding example with a chloronating agent, for example, phosphorous oxychloride.

*Example 64*

1 - (4 - carboxybutyl) - 7 - methyl - 4 - oxo - 1,8 - naphthyridine-3-carboxylic acid is obtained following the procedure described in Example 1 using 4-hydroxy-7-methyl-1,8-naphthyridine-3-carboxylic acid, potassium hydroxide, ethanol, water and 5-chloropentanoic acid.

*Example 65*

1 - (2 - carbethoxyethyl) - 7 - methyl - 4 - oxo - 1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and ethyl 3-bromopropanoate. The corresponding ethyl ester can be obtained following the procedure described in Example 16 using molar equivalent quantities of ethyl 4-hydroxy - 7 - methyl - 1,8 - naphthyridine - 3 - carboxylate, sodium ethoxide, absolute ethanol and ethyl 3-bromopropanoate.

*Example 66*

1 - cyclopropylmethyl - 7 - methyl - 4 - oxo - 1,8 - naphthyridine-3-carboxylic acid is obtained following the procedure described in Example 1 using molar equivalent quantities of 4 - hydroxy - 7 - methyl - 1,8 - naphthyridine-3-carboxylic acid, potassium hydroxide, ethanol, water and cyclopropylmethyl chloride. The corresponding ethyl ester can be obtained following the procedure described in Example 16 using molar equivalent quantities of sodium ethoxide, absolute ethanol, ethyl 4-hydroxy-7-methyl-1,8-naphthyridine-3-carboxylate and cyclopropylmethyl chloride.

*Example 67*

1 - cinnamyl - 7 - methyl - 4 - oxo - 1,8 - naphthyridine-3-carboxylic acid is obtained following the procedure described in Example 1 using molar equivalent quantities of 4 - hydroxy - 7 - methyl - 1,8 - naphthyridine - 3 - carboxylic acid, potassium hydroxide, ethanol, water and cinnamyl bromide.

*Example 68*

1 - (3 - ethoxypropyl) - 7 - methyl - 4 - oxo - 1,8-naphthyridine-3-carboxylic acid is obtained following the procedure described in Example 24 using molar equivalent quantities of 4-hydroxy-7-methyl-1,8-naphthyridine-3-carboxylic acid, potassium hydroxide, ethanol, water and 3-ethoxypropyl bromide.

*Example 69*

1 - (2 - benzyloxyethyl) - 7 - methyl - 4 - oxo - 1,8-naphthyridine-3-carboxylic acid is obtained following the procedure described in Example 24 using molar equivalent quantities of 4-hydroxy-7-methyl-1,8-naphthyridine-3-carboxylic acid, potassium hydroxide, ethanol, water and 2-benzyloxyethyl iodide.

*Example 70*

Ethyl 7 - methyl - 4 - oxo - 1 - (3 - phenoxypropyl)-1,8-naphthyridine-3-carboxylate is obtained following the procedure described in Example 16 using molar equivalent quantities of ethyl 4-hydroxy-7-methyl-1,8-naphthyridine-3-carboxylate, sodium ethoxide, absolute ethanol and 3-phenoxypropyl chloride.

*Example 71*

1 - (4 - ethoxybenzyl) - 7 - methyl-4-oxo-1,8-naphthyridine-3-carboxylic acid is obtained following the procedure described in Example 1 using molar equivalent quantities of 4 - hydroxy - 7-methyl-1,8-naphthyridine-3-carboxylic acid, potassium hydroxide, ethanol water and 4-ethoxybenzyl chloride. The corresponding sodium salt can be obtained following the procedure described in Example 2 using molar equivalent quantities of the acid, sodium hydroxide and ethanol. The corresponding ethyl ester can be obtained following the procedure described in Example 16 using molar equivalent quantities of ethyl 4-hydroxy-7-methyl-1,8-naphthyridine-3-carboxylate, sodium ethoxide, absolute ethanol and 4-ethoxybenzyl chloride.

*Example 72*

1 - (3-bromobenzyl-7-methyl-4-oxo-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 3-bromobenzyl bromide.

*Example 73*

1 - (4 - biphenylylmethyl) - 7 - methyl - 4 - oxo - 1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 4-biphenylylmethyl chloride.

*Example 74*

7 - methyl - 4 - oxo - 1 - (2 - thienylmethyl)-1,8-naphthyridine-3-carboxylic acid is obtained following the procedure described in Example 1 using molar equivalent quantities of 4-hydroxy-7-methyl-1,8-naphthyridine-3-carboxylic acid, potassium hydroxide, ethanol, water and 2-thienylmethyl chloride.

*Example 75*

1 - (3 - dimethylaminopropyl) - 7-methyl-4-oxo-1,8-naphthyridine-3-carboxylic acid is obtained following the procedure described in Example 30 using molar equivalent quantities of 4-hydroxy-7-methyl-1,8-naphthyridine-3-carboxylic acid, potassium hydroxide, ethanol, water and 3-dimethylaminopropyl chloride hydrochloride. The corresponding ethyl ester can be obtained following the procedure described in Example 16 using molar equivalent quantities of sodium ethoxide, absolute ethanol, ethyl 4-hydroxy-7-methyl-1,8-naphthyridine-3-carboxylate and 3-dimethylaminopropyl chloride hydrochloride.

*Example 76*

1 - (2 - di - n - butylaminoethyl - 7 - methyl-4-oxo-1,8-naphthyridine-3-carboxylic acid is obtained following the procedure described in Example 30 using molar equivalent quantities of 4-hydroxy-7-methyl-1,8-naphthyridine-3-carboxylic acid, potassium hydroxide, ethanol, water and 2-di-n-butylaminoethyl chloride hydrochloride.

*Example 77*

7 - methyl - 4 - oxo-1-[2-(1-piperidyl)ethyl]-1,8-naphthyridine-3-carboxylic acid is obtained following the procedure described in Example 30 using molar equivalent quantities of 4-hydroxy-7-methyl-1,8-naphthyridine-3-carboxylic acid, potassium hydroxide, ethanol, water and 2-(1-piperidyl)ethyl chloride hydrochloride.

*Example 78*

1 - cyclohexylmethyl - 7-(3,4-dimethoxystyryl)-4-oxo-1,8-naphthyridine-3-carboxylic acid is obtained following the procedure described in Example 33 using 7-(3,4-dimethoxystyryl) - 4 - hydroxy-1,8-naphthyridine-3-carboxylic acid, potassium hydroxide, ethanol, water and cyclohexylmethyl chloride. The corresponding ethyl ester can be prepared following the procedure described in Example 34 using ethyl 7-(3,4-dimethoxystyryl)-4-hydroxy-1,8-naphthyridine-3-carboxylate, potassium hydroxide, ethanol, water and cyclohexylmethyl chloride. The above intermediate ethyl 7-(3,4-dimethoxystyryl)-4-hydroxy-1,8-naphthyridine-3-carboxylate and corresponding 3-carboxylic acid are obtained following the procedure described in Example 33 using molar equivalent quantities of ethyl 4-hydroxy-7-methyl-1,8-naphthyridine-3-carboxylate, 3,4-dimethoxybenzaldehyde, acetic acid and acetic anhydride to obtain the ester and then hydrolyzing it with aqueous potassium hydroxide solution to obtain the corresponding intermediate acid.

*Example 79*

7 - (4 - chlorostyryl) - 1-[3-(N,N-dimethylcarbamyl)propyl]-4-oxo-1,8-naphthyridine-3-carboxylic acid is obtained following the procedure described in Example 33 using molar equivalent quantities of 7-(4-chlorostyryl)-4-hydroxy-1,8-naphthyridine-3-carboxylic acid, potassium hydroxide, ethanol, water and 3-(N,N-dimethylcarbamyl)propyl bromide. The intermediate 7-(4-chlorostyryl)-4-hydroxy-1,8-naphthyridine-3-carboxylic acid is obtained following the procedure described in Example 33 using molar equivalent quantities of ethyl 4-hydroxy-7-methyl-1,8-naphthyridine-3-carboxylate, 4-chlorobenzaldehyde, acetic acid and acetic anhydride to obtain the intermediate ethyl ester which is then converted into the corresponding acid by hydrolysis with potassium hydroxide solution.

*Example 80*

Ethyl 1 - carbo - n-hexyloxymethyl-4-oxo-7-styryl-1,8-naphthyridine-3-carboxylate is obtained following the procedure described in Example 16 using molar equivalent quantities of ethyl 4-hydroxy-7-styryl-1,8-naphthyridine-3-carboxylate, sodium ethoxide, absolute ethanol and n-hexyl chloroacetate.

*Example 81*

1 - (2 - methoxyethyl)-4-oxo-1,8-naphthyridine-3-carboxylic acid is obtained following the procedure described in Example 33 using molar equivalent quantities of 4-hydroxy-7-styryl-1,8-naphthyridine-3-carboxylic acid, potassium hydroxide, ethanol, water and 2-methoxyethyl bromide.

*Example 82*

7 - (4 - methylmercaptostyryl) - 4 - oxo-1-(3-phenylpropyl)-1,8-naphthyridine-3-carboxylic acid is obtained following the procedure described in Example 33 using molar equivalent quantities of 4-hydroxy-7-(4-methylmercaptostyryl)-1,8-naphthyridine-3-carboxylic acid, potassium hydroxide, ethanol, water and 3-phenylpropyl iodide. The intermediate 4-hydroxy-7-(4-methylmercaptostyryl)-1,8-naphthyridine-3-carboxylic acid is obtained following the procedure described in Example 33 using molar equivalent quantities of ethyl 4-hydroxy-7-methyl-1,8-naphthyridine-3-carboxylate, 4-methylmercaptobenzaldehyde, acetic acid and acetic anhydride to obtain the corresponding ethyl ester which is then saponified with aqueous potassium hydroxide solution to form the corresponding intermediate acid.

*Example 83*

4 - oxo-7-styryl-1-(3-thienylmethyl)-1,8-naphthyridine-3-carboxylic acid is obtained following the procedure described in Example 33 using molar equivalent quantities of 4-hydroxy-7-styryl-1,8-naphthyridine-3-carboxylic acid, potassium hydroxide, ethanol, water and 3-thienylmethyl bromide.

*Example 84*

4 - oxo - 1-[3-(4-pyridyl)propyl]-7-styryl-1,8-naphthyridine-3-carboxylic acid is obtained following the procedure described in Example 33 using 4-hydroxy-7-styryl-1,8-naphthyridine-3-carboxylic acid, potassium hydroxide, ethanol, water and 3-(4-pyridyl)propyl chloride hydrochloride.

*Example 85*

1 - (4 - diethylaminobutyl) - 4 - oxo - 7-styryl-1,8-naphthyridine-3-carboxylic acid is obtained following the procedure described in Example 30 using molar equivalent quantities of 4-hydroxy-7-styryl-1,8-naphthyridine-3-carboxylic acid, potassium hydroxide, ethanol, water and 4-diethylaminobutyl chloride. The corresponding ethyl ester can be obtained following the procedure described in Example 34 using molar equivalent quantities of ethyl 4-hydroxy - 7 - styryl - 1,8-naphthyridine-3-carboxylate, potassium hydroxide, ethanol, water and 4-diethylaminobutyl chloride hydrochloride.

*Example 86*

1 - [3 - (1 - pyrrolidyl)propyl]-4-oxo-7-styryl-1,8-naphthyridine-3-carboxylic acid is obtained following the procedure described in Example 30 using molar equivalent quantities of 4-hydroxy-7-styryl-1,8-naphthyridine-3-carboxylic acid, potassium hydroxide, ethanol, water and 3-(1-pyrrolidyl)propyl chloride hydrochloride.

*Example 87*

1 - ethyl - 4 - oxo - 7-[2-(3-pyridyl)ethenyl]1,8-naphthyridine-3-carboxylic acid is obtained following the procedure described in Example 33 using molar equivalent quantities of 4 - hydroxy - 7 - [2-(3-pyridyl)ethenyl]-1,8-naphthyridine-3-carboxylic acid, potassium hydroxide, ethanol, water and ethyl iodide. The intermediate 4-hydroxy - 7 - [2 - (3 - pyridyl)ethenyl]-1,8-naphthyridine-3-carboxylic acid is obtained in two steps following the procedure described in Example 33 using molar equivalent quantities first of ethyl 4-hydroxy-7-methyl-1,8-naphthyridine-3- carboxylate, pyridine-3-aldehyde, acetic acid and acetic anhydride to yield ethyl 4-hydroxy-7-[2-(3-pyridyl)-ethenyl]-1,8-naphthyridine-3-carboxylate and then reacting this ester with aqueous potassium hydroxide solution to yield the corresponding intermediate acid.

*Example 88*

7 - n - butoxy - 1 - ethyl-4-oxo-1,8-naphthyridine-3-carboxylic acid is obtained following the procedure described in Example 56 using molar equivalent quantities of 7-chloro-1-ethyl-4-oxo-1,8-naphthyridine-3-carboxylic acid, dimethylformamide, sodium n-butoxide and n-butanol. The sodium salt of this acid can be obtained following the procedure described in Example 2 using molar equivalent quantities of the acid and sodium hydroxide in ethanol. Alternatively, the acid can be obtained following the procedure described in Example 1 using molar equivalent quantities of 7-n-butoxy-4-hydroxy-1,8-naphthyridine-3-carboxylic acid, potassium hydroxide, ethanol, water and ethyl iodide.

*Example 89*

1 - ethyl - 4 - oxo - 7 - phenoxy-1,8-naphthyridine-3-carboxylic acid is obtained following the procedure described in Example 56 using molar equivalent quantities of 7-chloro-1-ethyl-4-oxo-1,8-naphthyridine-3-carboxylic acid and sodium phenoxide.

*Example 90*

7 - n - butanoylamino - 1 - ethyl-4-oxo-1,8-naphthyridine-3-carboxylic acid is obtained following the procedure described in Example 51 using molar equivalent quantities of 7 - amino-1-ethyl-4-oxo-1,8-naphthyridine-3-carboxylic acid, n-butanoic anhydride and sulfuric acid.

*Example 91*

7 - n - butylamino - 1 - ethyl-4-oxo-1,8-naphthyridine-3-carboxylic acid is obtained following the procedure described in Example 59 using molar equivalent quantities of 7 - chloro-1-ethyl-4-oxo-1,8-naphthyridine-3-carboxylic acid and n-butylamine.

*Example 92*

1 - ethyl - 4 - oxo - 7 - [2-(1-piperidyl)ethylamino]-1,8-naphthyridine-3-carboxylic acid is obtained following the procedure described in Example 60 using molar equivalent quantities of 7-chloro-1-ethyl-4-oxo-1,8-naphthyridine-3-carboxylic acid, 2-(1-piperidyl)ethylamine and acetonitrile. This compound can be isolated in its free base form or in the form of its acid-addition salt, for example, its hydrochloride.

*Example 93*

1 - ethyl - 7 - methyl - 4 - oxo-1,8-naphthyridine-3-carboxylic acid was obtained by alkylating the dipotassium salt of 4-hydroxy-7-methyl-1,8-naphthyridine-3-carboxylic acid as follows: A 4.6 g. portion of ethyl 4-hydroxy-7-methyl-1,8-naphthyridine-3-carboxylate was dissolved by warming it in an aqueous solution containing 2.6 g. of potassium hydroxide. The solution was then evaporated to dryness on a steam bath in vacuo. Benzene was added and distilled to remove the last traces of water. There was thus obtained the dipotassium salt of 4-hydroxy-7-methyl-1,8-naphthyridine-3-carboxylic acid. To this dipotassium salt was added 30 cc. of ethyl sulfate and the mixture was heated upon a steam bath in a flask sealed with a drying tube containing anhydrous calcium sulfate. The reaction mixture was heated for 4 hours and poured into water. The resulting mixture was heated with stirring and excess 10% aqueous potassium hydroxide solution was added to destroy the excess ethyl sulfate. The mixture was stirred for 30 minutes and then allowed to stand overnight. The solution was acidified with 6N hydrochloric acid solution and the precipitate that separated was collected, recrystallized from acetonitrile using decolorizing charcoal and air-dried to yield 2.2 g. (48%) of 1-ethyl-7-methyl-4-oxo-1,8-naphthyridine-3-carboxylic acid, M.P. 229–231° C. A mixed melting point of this product with the product obtained in Example 1 by reacting 4-hydroxy-7-methyl-1,8-naphthyridine-3-carboxylic acid with ethyl iodide gave no depression.

*Example 94*

1 - ethyl - 7 - methyl - 4 - oxo-1,8-naphthyridine-3-nitrile was prepared as follows: A mixture containing 23.1 g. of 1 - ethyl-7-methyl-4-oxo-1,8-naphthyridine-3-carboxamide, 19.4 g. of benzenesulfonyl chloride and 20 g. of pyridine was stirred at room temperature for about 10 minutes with no rise in temperature noted. The reaction mixture was then warmed with stirring up to about 75° C. Stirring was continued with no external heating whereupon the inside temperature rose slowly to about 80° C. After dissolution had been completed, the reaction mixture was allowed to cool to room temperature whereupon it solidified. It was then broken up, taken up with water and a relatively large volume of chloroform, and the resulting mixture was filtered through diatomaceous earth. The chloroform layer was separated and washed successively with 1 N hydrochloric acid, water and dilute ammonium hydroxide solution. It was then dried over anhydrous potassium carbonate, filtered, and evaporated to dryness. The resulting solid was recrystallized from ethanol using decolorizing charcoal and air-dried to yield 10 g. of the product, 1 - ethyl - 7-methyl-4-oxo-1,8-naphthyridine-3-nitrile, M.P. 220–226° C. (corr.).

*Analysis.*—Calcd. for $C_{12}H_{11}N_3O$: C, 67.60; H, 5.20; N, 19.70. Found: C, 67.29; H, 5.15; N, 20.00.

*Example 95*

1-ethyl-7-(4-nitrostyryl) - 4 - oxo-1,8-naphthyridine-3-carboxylic acid is obtained following the procedure described in Example 33 using molar equivalent quantities of 4-hydroxy-7-(4-nitrostyryl) - 1,8-naphthyridine-3-carboxylic acid, potassium hydroxide, ethanol, water and ethyl iodide. The corresponding ethyl ester is obtained following the procedure described in Example 34 using molar equivalent quantities of ethyl 4-hydroxy-7-(4-nitrostyryl)-1,8-naphthyridine - 3 - carboxylate, potassium hydroxide, ethanol, water and ethyl iodide.

The above intermediate ethyl 4-hydroxy-7-(4-nitrostyryl)-1,8-naphthyridine-3-carboxylate was obtained following the procedure described in Example 33 using 76.6 g. of ethyl 4-hydroxy-7-methyl-1,8-naphthyridine-3-carboxylate, 50 g. of 4-nitrobenzaldehyde, 110 cc. of acetic acid and 185 cc. of acetic anhydride. There was thus obtained 57.0 g. (47%) of the intermediate ester after one recrystallization from dimethylformamide using decolorizing charcoal. A 15 gram sample was recrystallized a second time from dimethylformamide for analysis to yield 13.6 g. of the doubly recrystallized ester, M.P. >300° C. (corr.).

Analysis.—Calcd. for $C_{19}H_{15}N_3O_5$: C, 62.48; H, 4.14; N, 11.50. Found: C, 62.74; H, 4.11; N, 11.45.

The intermediate ester is converted into its corresponding carboxylic acid following the procedure described in Example 33 using molar equivalent quantities of the ester and 10% aqueous potassium hydroxide solution.

*Example 96*

1,4 - bis (3 - carboxy - 7 - methyl - 4 - oxo - 1,8 - naphthyridyl - 1) - 2 - butene was prepared as follows: To a refluxed mixture containing 20.4 g. of 4-hydroxy-7-methyl-1,8-naphthyridine-3-carboxylic acid, 19.5 g. of potassium hydroxide, 150 cc. of water and 385 cc. of ethanol was added dropwise over a period of 90 minutes a solution containing 6.25 g. of 1,4-dichloro-2-butene dissolved in 25 cc. of ethanol. Refluxing was continued for an additional 90 minutes and the reaction mixture was then allowed to cool and stand overnight at room temperature. The crystalline solid that had separated was dissolved by heating the reaction mixture to reflux and the resulting solution was acidified with 19 cc. of concentrated hydrochloric acid. Some solid separated and the resulting mixture was cooled in an ice bath to yield more solid. The solid was collected, washed with water, recrystallized from formic acid using decolorizing charcoal and then recrystallized a second time from dimethyl sulfoxide to yield 1.1 g. of product, 1,4-bis(3-carboxy-7-methyl-4-oxo-1,8-naphthyridyl-1)-2-butene, M.P. 365° C. with decomposition.

Anaylsis.—Calcd. for $C_{24}H_{20}N_4O_6$: C, 62.60; H, 4.38; N, 12,17. Found: C, 62.56; H, 4.20; N, 12.22.

*Example 97*

1,4 - bis(3 - carboxy - 7 - methyl - 4 - oxo - 1,8 - naphthyridyl - 1) - butane was prepared by catalytically hydrogenating the corresponding 2-butene derivative as follows: A mixture containing 0.8 g. of 1,4-bis(3-carboxy-7-methyl-4-oxo-1,8-naphthyridyl-1)-2-butene, 4 cc. of 10% aqueous potassium hydroxide solution, 150 cc. of water and Raney nickel was shaken with hydrogen under pressure (50 lbs. per sq. in.) at room temperature (27° C.). After about 40 minutes the uptake of hydrogen had stopped. The mixture was shaken for an additional hour; and the catalyst was filtered and washed with dilute potassium hydroxide solution. The filtrate was heated to boiling and acidified with concentrated hydrochloric acid. The white solid that separated was collected, recrystallized from dimethyl sulfoxide using decolorizing charcoal, washed with acetone and dried in vacuo at 70° C. to yield 0.3 g. of the product, 1,4-bis(3-carboxy-7-methyl-4-oxo-1,8-naphthyridyl-1)butane, M.P. 342–343° C. with decomposition.

Analysis.—Calcd. for $C_{24}H_{22}N_4O_6$: C, 62.33; H, 4.80; N, 12,12. Found: C, 62.35; H, 4.99; N, 11.60.

Also encompassed by our invention are the following compounds:

1-(2-cyanoethyl)-7-methyl-4-oxo-1,8-naphthyridine-3-carboxylic acid
1-(2-carbamylethyl)-7-methyl-4-oxo-1,8-naphthyridine-3-carboxylic acid
ethyl 1-(2-carbamylethyl)-7-methyl-4-oxo-1,8-naphthyridine-3-carboxylate
7-methyl-4-oxo-1-[2-(3-pyridyl)ethyl]-1,8-naphthyridine-3-carboxylic acid
7-methyl-4-oxo-1-(2-n-propylaminoethyl)-1,8-naphthyridine-3-carboxylic acid
ethyl 1-(5-ethylaminopentyl)-7-methyl-4-oxo-1,8-naphthyridine-3-carboxylate
1-[2-(2-chlorobenzylamino)ethyl]-7-methyl-4-oxo-1,8-naphthyridine-3-carboxylic acid
1-(4-cyanobutyl)-4-oxo-7-styryl-1,8-naphthyridine-3-carboxylic acid
1-[3-(3-hydroxypropylamino)propyl]-4-oxo-7-styryl-1,8-naphthyridine-3-carboxylic acid
ethyl 4-oxo-1-[2-(2-phenylethylamino)ethyl]-7-styryl-1,8-naphthyridine-3-carboxylate
7-n-butoxy-1-ethyl-4-oxo-1,8-naphthyridine-3-carboxylic acid
5,6-dimethoxy-1-ethyl-4-oxo-1,8-naphthyridine-3-carboxylic acid
1,7-diethyl-4-oxo-1,8-naphthyridine-3-carboxylic acid
4-oxo-1-n-propyl-7-trifluoromethyl-1,8-naphthyridine-3-carboxylic acid
7-benzyl-1-ethyl-4-oxo-1,8-naphthyridine-3-carboxylic acid
4-oxo-1,5,6,7-tetramethyl-1,8-naphthyridine-3-carboxylic acid
2,7-dimethyl-1-ethyl-4-oxo-1,8-naphthyridine-3-carboxylic acid
7-benzyloxy-4-oxo-1-n-propyl-1,8-naphthyridine-3-carboxylic acid
ethyl 7-acetamido-1-ethyl-5-ethoxy-4-oxo-1,8-naphthyridine-3-carboxylate
1-ethyl-7-fluoro-4-oxo-1,8-naphthyridine-3-carboxylic acid
1-ethyl-4-oxo-7-trichloromethyl-1,8-naphthyridine-3-carboxylic acid
1-ethyl-6-hydroxy-7-methyl-4-oxo-1,8-naphthyridine-3-carboxylic acid
phenyl 1-ethyl-7-methyl-4-oxo-1,8-naphthyridine-3-carboxylate
4-chlorophenyl 1-ethyl-7-methyl-4-oxo-1,8-naphthyridine-3-carboxylate
3-methylphenyl 1-ethyl-7-methyl-4-oxo-1,8-naphthyridine-3-carboxylate
phenyl 1-ethyl-7-methyl-4-oxo-1,8-naphthyridine-3-carbothiolate
ethyl 1-ethyl-7-methyl-4-oxo-1,8-naphthyridine-3-carbothiolate
6-acetyl-1-ethyl-4-oxo-1,8-naphthyridine-3-carboxylic acid
1-ethyl-6-methyl-4-oxo-1,8-naphthyridine-3-carboxylic acid
1-ethyl-5-methyl-4-oxo-1,8-naphthyridine-3-carboxylic acid
6,7-dimethyl-1-ethyl-4-oxo-1,8-naphthyridine-3-carboxylic acid
6-bromo-1-ethyl-2,5,7-trimethyl-4-oxo-1,8-naphthyridine-3-carboxylic acid
1-ethyl-7-ethylsulfinyl-4-oxo-1,8-naphthyridine-3-carboxylic acid
7-n-butylsulfonyl-1-ethyl-4-oxo-1,8-naphthyridine-3-carboxylic acid
1-ethyl-7-methyl-6-nitro-4-oxo-1,8-naphthyridine-3-carboxylic acid
1-ethyl-7-(3-ethylaminopropyl)-4-oxo-1,8-naphthyridine-3-carboxylic acid
1-ethyl-7-[2-(1-piperidyl)ethyl]-4-oxo-1,8-naphthyridine-3-carboxylic acid
ethyl 1-ethyl-7-(2-n-propylaminoethylamino)-4-oxo-1,8-naphthyridine-3-carboxylate
ethyl 1-ethyl-7-(3-ethylaminopropoxy)-4-oxo-1,8-naphthyridine-3-carboxylate
1-ethyl-7-phenyl-4-oxo-1,8-naphthyridine-3-carboxylic acid
1-ethyl-7-phenylmercapto-4-oxo-1,8-naphthyridine-3-carboxylic acid
7-(4-ethoxyphenylamino)-1-n-propyl-4-oxo-1,8-naphthyridine-3-carboxylic acid
7-benzoyl-1-ethyl-6-methyl-4-oxo-1,8-naphthyridine-3-carboxylic acid
7-[2-(3,4-dimethoxyphenyl)ethoxy]-1-ethyl-4-oxo-1,8-naphthyridine-3-carboxylic acid
7-cyano-1-ethyl-4-oxo-1,8-naphthyridine-3-carboxylic acid
ethyl 7-aminomethyl-1-ethyl-4-oxo-1,8-naphthyridine-3-carboxylate
7-carbamyl-1-methyl-4-oxo-1,8-naphthyridine-3-carboxylic acid diethyl 1-ethyl-4-oxo-1,8-naphthyridine-3,7-dicarboxylate
1-ethyl-7-hydroxymethyl-4-oxo-1,8-naphthyridine-3-carboxylic acid
1-ethyl-7-(2-hydroxyethyl)-4-oxo-1,8-naphthyridine-3-carboxylic acid
7-acetaminomethyl-1-ethyl-4-oxo-1,8-naphthyridine-3-carboxylic acid
6-bromo-1-ethyl-4-oxo-1,8-naphthyridine-3-carboxylic acid and
1-ethyl-2-hydroxy-7-methyl-4-oxo-1,8-naphthyridine-3-carboxylic acid

We claim:
1. A compound of the formula

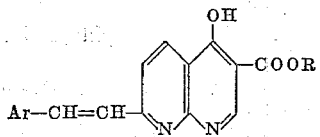

wherein Ar is monocarbocyclic-aryl having six ring-carbon atoms and R is a member selected from the group consisting of hydrogen and lower-alkyl.

2. 4-hydroxy-7-styryl-1,8-naphthyridine-3-carboxylic acid.

3. Ethyl 4-hydroxy-7-styryl-1,8-napthyridine-3-carboxylate.

4. 4-hydroxy-7-(4-methoxystyryl)-1,8-naphthyridine-3-carboxylic acid.

5. Ethyl 4-hydroxy-7-(4-methoxystyryl)-1,8-naphthyridine-3-carboxylate.

References Cited in the file of this patent
UNITED STATES PATENTS

| | | |
|---|---|---|
| 2,476,464 | Stiller | July 19, 1949 |
| 2,719,150 | Hellerbach | Sept. 27, 1955 |
| 2,742,463 | Finkelstein | Apr. 17, 1956 |
| 2,995,561 | Habicht | Aug. 8, 1961 |

OTHER REFERENCES

Chem. Absts. vol. 38 (1944), p. 1507, (Abst. of Migliardi "Att'r Accad. Sci., Torino, Classe ser. fis. mat, nat." vol. 75, pp. 548–51, 1940).

Lappin: J.A.C.S., vol. 70 (1948), pp. 3348–51.

Wiselogle: "Survey of Anti-Malarial Drugs," 1941–1945, vol. II, Pt. 2, p. 1385.

Allen: "Chemical Reviews," vol. 47, Oct. 1950, p. 293.

UNITED STATES PATENT OFFICE
CERTIFICATE OF CORRECTION

Patent No. 3,149,104                                  September 15, 1964

George Y. Lesher et al.

It is hereby certified that error appears in the above numbered patent requiring correction and that the said Letters Patent should read as corrected below.

Column 1, line 12, for "the" read -- their --; column 2, line 51, for "alknyl" read -- alkynyl --; line 58, for "3-(propenoxy)propyl" read -- 3-(2-propenoxy)propyl --; column 3, line 74, for "N-heteromonoyclic" read -- N-heteromonocyclic --; column 5, line 16, for "a" read -- an --; line 49, for "-oxo-naphthyridine-" read -- -oxo-1,8-naphthyridine- --; line 65, for "-napthyridine-" read -- -naphthyridine- --; column 9, line 24, for "later" read -- liter --; column 11, line 23, for "teseted" read -- tested --; column 12, line 20, for "960" read -- 9.60 --; column 16, line 39, for "slovent" read -- solvent --; column 17, line 4, for "C, 10.49" read -- Cl, 10.49 --; column 20, line 74, for "-3-oxo-" read -- -4-oxo- --; column 23, line 72, for "-nahpthyridine-" read -- -naphthyridine- --; column 24, line 4, for "-styrl-" read -- -styryl- --; line 19, for "methanol" read -- ethanol --; line 46, for "-naphthydridine-" read -- -naphthyridine- --;same column 24, line 59, after "reflux" insert -- period --; column 25, line 45, for "aquesous" read -- aqueous --; column 26, line 52, for "iodine" read -- iodide --; column 29, line 8, for "raction" read -- reaction --; column 32, line 71, after "ethanol" insert a comma; column 33, line 7, for "-(3-bromobenzyl-7-" read -- -(3-bromobenzyl)-7- --; line 43, for "-(2-di-n-butylaminoethyl-7-" read -- -(2-di-n-butylaminoethyl)-7- --.

Signed and sealed this 13th day of April 1965.

(SEAL)
Attest:

ERNEST W. SWIDER                                        EDWARD J. BRENNER
Attesting Officer                                       Commissioner of Patents